(12) United States Patent
Lee et al.

(10) Patent No.: US 9,813,629 B2
(45) Date of Patent: Nov. 7, 2017

(54) IMAGE PHOTOGRAPHING APPARATUS, IMAGE PHOTOGRAPHING SYSTEM FOR PERFORMING PHOTOGRAPHING BY USING MULTIPLE IMAGE PHOTOGRAPHING APPARATUSES, AND IMAGE PHOTOGRAPHING METHODS THEREOF

(71) Applicant: SAMSUNG ELECTRONICS CO., LTD., Suwon-si (KR)

(72) Inventors: Jin-Won Lee, Seongnam-si (KR); Yong-Hee Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/806,956

(22) Filed: Jul. 23, 2015

(65) Prior Publication Data
US 2016/0050351 A1 Feb. 18, 2016

(30) Foreign Application Priority Data

Aug. 14, 2014 (KR) ........................ 10-2014-0105982

(51) Int. Cl.
*H04N 5/232* (2006.01)
*H04N 5/225* (2006.01)

(52) U.S. Cl.
CPC ....... *H04N 5/23296* (2013.01); *H04N 5/2252* (2013.01); *H04N 5/2254* (2013.01);
(Continued)

(58) Field of Classification Search
CPC ............. H04N 5/23296; H04N 5/2258; H04N 5/23203; H04N 5/23209; H04N 5/2259;
(Continued)

(56) References Cited

U.S. PATENT DOCUMENTS 7,239,349 B2 7/2007 Saito et al.
7,983,557 B2 7/2011 Misawa et al.
(Continued)

FOREIGN PATENT DOCUMENTS

JP 08-271976 A 10/1996
JP 10-257362 A 9/1998
(Continued)

OTHER PUBLICATIONS

Communication dated Dec. 10, 2015, issued by the International Searching Authority in counterpart International Application No. PCT/KR2015/008209 (PCT/ISA/210 & PCT/ISA/237).
(Continued)

*Primary Examiner* — Jason Flohre
(74) *Attorney, Agent, or Firm* — Sughrue Mion, PLLC

(57) ABSTRACT

An image photographing apparatus, an image photographing method thereof, and an image photographing system using a plurality of image photographing apparatuses, and an image photographing method thereof are provided. The image photographing apparatus includes: a camera configured to capture a first image of a subject by using a lens having a first focal distance; a combiner configured to combine the image photographing apparatus with another image photographing apparatus including a lens having a second focal distance different from the first focal distance; a controller configured to, in response to a photographing command being input, control the camera and the another image photographing apparatus to respectively perform photographing; an image processor configured to generate a captured image by using the first image captured by the camera and a second image captured by the another image photographing apparatus; and a display configured to display the captured image.

40 Claims, 55 Drawing Sheets

(52) U.S. Cl.
CPC ......... *H04N 5/2258* (2013.01); *H04N 5/2259* (2013.01); *H04N 5/23203* (2013.01); *H04N 5/23209* (2013.01); *H04N 5/23212* (2013.01); *H04N 5/23216* (2013.01); *H04N 5/23293* (2013.01)

(58) Field of Classification Search
CPC ........... H04N 5/23293; H04N 5/23212; H04N 5/2252; H04N 5/2254; H04N 5/23216
See application file for complete search history.

(56) References Cited

U.S. PATENT DOCUMENTS

| | | |
|---|---|---|
| 8,229,295 B2 | 7/2012 | Wu |
| 8,638,357 B2 | 1/2014 | Tomizawa et al. |
| 8,638,369 B2 | 1/2014 | Tsai |
| 8,639,106 B1 | 1/2014 | Gleason et al. |
| 8,917,318 B2 | 12/2014 | Tomizawa et al. |
| 9,360,671 B1* | 6/2016 | Zhou ................... H04N 5/23216 |
| 2002/0013161 A1* | 1/2002 | Schaeffer ............. H04N 5/2256 455/557 |
| 2002/0122113 A1 | 9/2002 | Foote |
| 2006/0233545 A1* | 10/2006 | Senba ................... H04N 5/2254 396/529 |
| 2007/0024737 A1* | 2/2007 | Nakamura ......... H04N 5/23293 348/335 |
| 2007/0025714 A1* | 2/2007 | Shiraki ................ H04N 5/2258 396/72 |
| 2008/0084484 A1* | 4/2008 | Ochi .................. H04N 5/23293 348/222.1 |
| 2010/0225744 A1 | 9/2010 | Tomizawa et al. |
| 2010/0321470 A1* | 12/2010 | Oshima ................ H04N 5/2258 348/36 |
| 2011/0025829 A1 | 2/2011 | McNamer et al. |
| 2011/0267432 A1* | 11/2011 | Kumakura ........... H04N 5/2252 348/47 |
| 2012/0074227 A1* | 3/2012 | Ferren .................... H04N 5/232 235/462.21 |
| 2012/0075489 A1* | 3/2012 | Nishihara .......... H04N 5/23296 348/222.1 |
| 2012/0270599 A1* | 10/2012 | Mori ................. H04M 1/72527 455/556.1 |
| 2013/0150122 A1* | 6/2013 | Kulas .................. H04M 1/0254 455/556.1 |
| 2013/0162759 A1* | 6/2013 | Alakarhu ........... H04N 5/23245 348/36 |
| 2013/0278722 A1* | 10/2013 | Chen ..................... G03B 35/08 348/46 |
| 2014/0071548 A1 | 3/2014 | Sanford et al. |
| 2014/0111624 A1 | 4/2014 | Tomizawa et al. |
| 2014/0160304 A1* | 6/2014 | Galor ................ H04N 5/23206 348/207.1 |
| 2014/0347503 A1* | 11/2014 | Endo .................. H04N 5/23216 348/207.11 |
| 2015/0220801 A1* | 8/2015 | Sato ................... H04N 5/23222 348/207.1 |

FOREIGN PATENT DOCUMENTS

| | | |
|---|---|---|
| JP | 2002-232822 A | 8/2002 |
| JP | 2003-060962 A | 2/2003 |
| JP | 2004-072194 A | 3/2004 |
| JP | 2004129027 A | 4/2004 |
| JP | 2005-100061 A | 4/2005 |
| JP | 2007-306433 A | 11/2007 |
| JP | 2007-312297 A | 11/2007 |
| JP | 2010157850 A | 7/2010 |
| JP | 2010212881 A | 9/2010 |
| JP | 2012227740 A | 11/2012 |
| KR | 10-2008-0111803 A | 12/2008 |
| KR | 20-0464546 Y1 | 1/2013 |
| KR | 1020140091117 A | 7/2014 |

OTHER PUBLICATIONS

Communication dated Dec. 30, 2016, issued by the United States Patent and Trademark Office in U.S. Appl. No. 14/561,882.
Office Action dated Jul. 13, 2017, issued by the United States Patent and Trademark Office in U.S. Appl. No. 14/561,882.

* cited by examiner

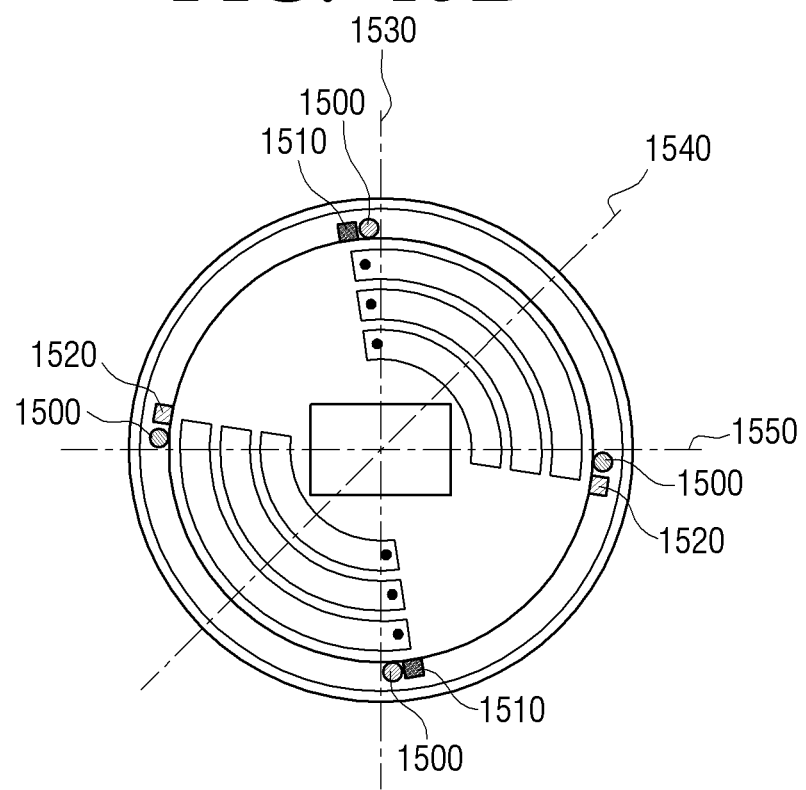

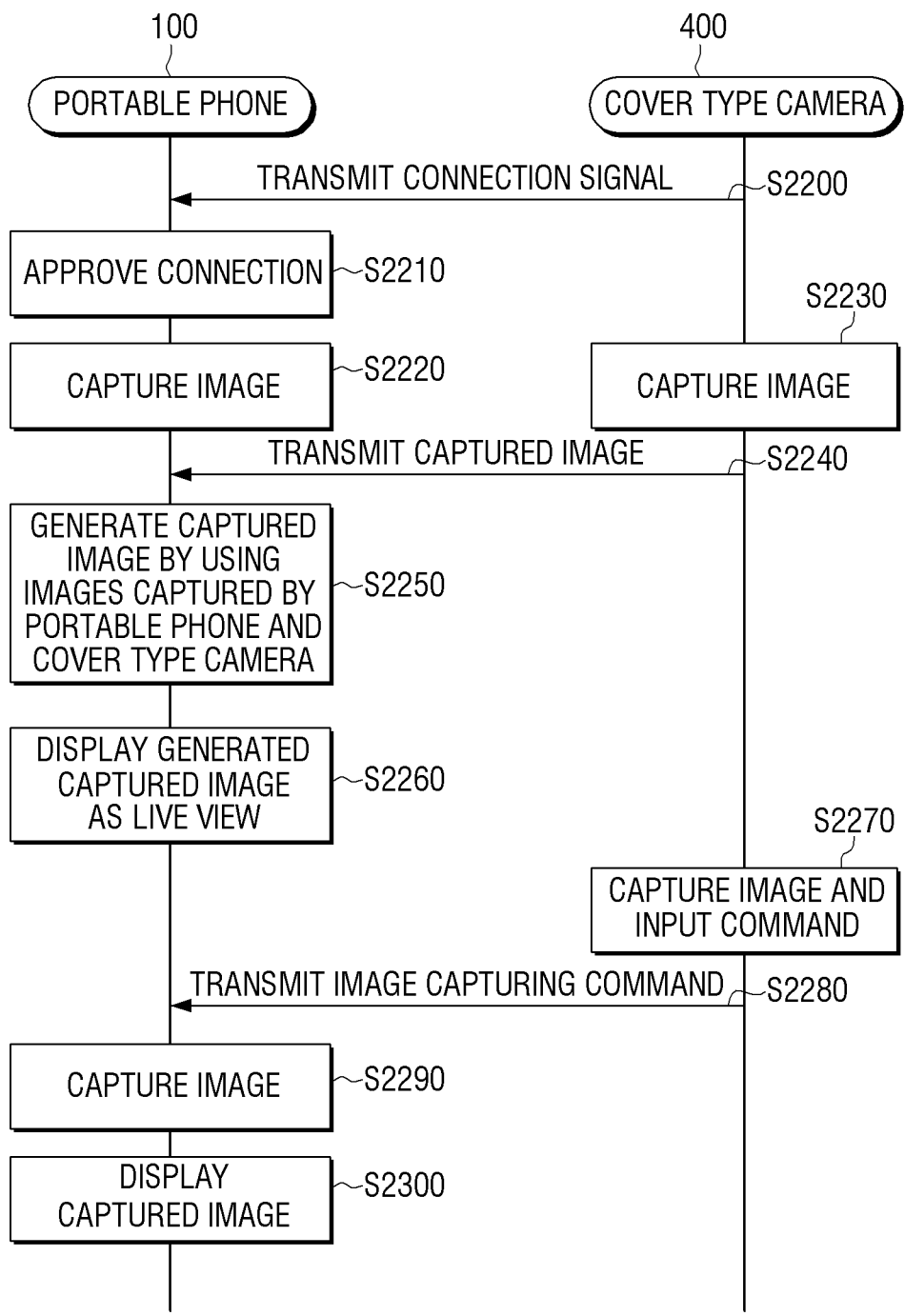

IMAGE PHOTOGRAPHING APPARATUS, IMAGE PHOTOGRAPHING SYSTEM FOR PERFORMING PHOTOGRAPHING BY USING MULTIPLE IMAGE PHOTOGRAPHING APPARATUSES, AND IMAGE PHOTOGRAPHING METHODS THEREOF

CROSS-REFERENCE TO RELATED APPLICATION(S)

This application claims priority from Korean Patent Application No. 10-2014-0105982, filed on Aug. 14, 2014 in the Korean Intellectual Property Office, the disclosure of which is incorporated by reference herein in its entirety.

BACKGROUND

1. Field

Apparatuses, systems, and methods consistent with exemplary embodiments relate to providing an image photographing apparatus, an image photographing system for performing photographing by using a plurality of image photographing apparatuses, and image photographing methods thereof, and more particularly, to providing an image photographing system for combining a plurality of photographing apparatuses to generate a captured image, an image photographing apparatus used in the image photographing system, and image photographing methods thereof.

2. Description of the Related Art

Users have recently easily encountered electronic devices having camera functions. For example, recently used portable phones mainly include cameras, and various types of devices, such as a personal digital assistant (PDA), a tablet personal computer (PC), a black box, etc., also include cameras. Also, large-size electronic devices, such as a television (TV), etc., have increasingly provided camera functions.

Cameras that are installed in electronic devices, such as a portable phone, etc., mainly have lenses that do not protrude from the cameras. Therefore, there is a limit to an amount of enlargement that can be performed with an electronic device as described above.

SUMMARY

Exemplary embodiments address at least the above disadvantages and/or other disadvantages not described above. Also, the exemplary embodiments are not required to overcome the disadvantages described above, and an exemplary embodiment may not overcome any of the disadvantages described above.

The exemplary embodiments provide an image photographing system for combining a plurality of image photographing apparatuses to capture an image, and an image photographing apparatus, and image photographing methods thereof.

According to an aspect of an exemplary embodiments, there is provided an image photographing apparatus including a camera including a lens having a first focal distance, the camera being configured to capture a first image a subject by using a lens having a first focal distance; a combiner configured to combine the image photographing apparatus with another image photographing apparatus comprising a lens having a second focal distance different from the first focal distance; a controller configured to, in response to a photographing command being input, control the camera and the another image photographing apparatus to respectively perform photographing; an image processor configured to generate a captured image by using the first image captured by the camera and a second image captured by the another image photographing apparatus; and a display configured to display the captured image.

In response to the photographing command being transmitted from the another image photographing apparatus, the controller may be configured control the camera to capture the subject according to the photographing command.

The image photographing apparatus may further comprise an inputter configured to receive the photographing command, and in response to the photographing command being input, the controller may be configured to control the camera to capture the subject and transmit the photographing command to the another image photographing apparatus.

The image photographing apparatus may further include an interface configured to be electrically connected to an interface of the another image photographing apparatus in response to the another image photographing apparatus being combined with the image photographing apparatus through the combiner.

The second focal distance may be longer than the first focal distance, and the controller may control the image processor to overlap the second image with a local area of the first image and generate the captured image including a border line for distinguishing the second and first images from each other.

The controller may be configured to control the display to display the first image on a whole area of the display in response to a first image part being touched on the captured image displayed on the display, and control the display to display the second image on the whole area of the display in response to a second image part being touched on the captured image.

In response to a user command being input to adjust a magnification of the captured image, the controller may be configured to adjust a photographing magnification of at least one selected from the camera and the another image photographing apparatus.

The first image may be a first live view image, and the second image may be a second live view image, and the controller may be configured to control the image processor to display, on the display, an integrated live view, in which a second live view captured by the another image photographing apparatus overlaps with a local area of a first live view captured by the camera and, in response to a photographing command being input, control the image processor generate a captured image corresponding to the integrated live view.

The controller may be configured to control the image processor to, in response to the first live view being displayed and an user-selected local area being selected from the first live view according to a user manipulation, overlap the second live view captured by the another image photographing apparatus in the arbitrary local area.

The controller may be configured to determine a photographing magnification according to a size of the user-selected local area to control the camera so as to capture the subject at the photographing magnification and transmit a control command for controlling the photographing magnification of the another image photographing apparatus.

The image photographing apparatus may further include a storage configured to store the captured image, and in response to a continuous photographing command, the controller may display the first live view on the display, control the another image photographing apparatus to perform continuous photographing, and store a generated continuous captured image in the storage.

The image photographing apparatus may further include a sensor configured to sense a motion of the image photographing apparatus, and in response to a barrel of the another image photographing apparatus being lengthened, the subject being captured, and the motion of the image photographing apparatus meeting a threshold condition, the controller may be configured to control a length of the barrel of the another image photographing apparatus.

The combiner may be a structure with which one of the another image photographing apparatus and a battery cover is selectively detachably combined.

According to an aspect of another exemplary embodiment, there is provided an image photographing method of an image photographing apparatus, the method including in response to the image photographing apparatus and another image photographing apparatus being combined with each other and a photographing command being input, capturing a subject through the image photographing apparatus comprising a lens having a first focal distance and the another image photographing apparatus comprising a lens having a second focal distance different from the first focal distance; generating a captured image by using a first image captured by the image photographing apparatus and a second image captured by the another image photographing apparatus; and displaying the captured image.

In response to the photographing command being transmitted from the another image photographing apparatus, the subject may be captured according to the photographing command.

The image photographing method may further include receiving the photographing command through an input of the image photographing apparatus; and capturing the subject according to the photographing command and transmitting the photographing command to the another image photographing apparatus.

The image photographing method may further include in response to the image photographing apparatus being physically combined with the another image photographing apparatus, electrically connecting the image photographing apparatus to an interface of the another image photographing apparatus.

The second focal distance may be longer than the first focal distance, and the second image may overlap with a local area of the first image, and the captured image may comprise a border line for distinguishing the second and first images from each other is generated.

The first image may be displayed on a whole area of a display in response to a first image part being touched on the displayed captured image, and the second image may be displayed on the whole area of the display in response to a second image part being touched on the captured image.

The image photographing method may further include in response to a user command being input to adjust a magnification of the captured image, adjusting a photographing magnification of at least one selected from the image photographing apparatus and the another image photographing apparatus.

The first image may be a first live view image, and the second image may be a second live view image, and an integrated live view, in which the second live view overlaps with a local area of the first live view, may be displayed, and in response to the photographing command being input, a captured image corresponding to the integrated live view may be generated.

In response to the first live view being displayed and a user-selected local area being selected from the first live view according to a user manipulation, the captured image may be generated so as to enable a second live view captured by the another image photographing apparatus to overlap in the local area.

The image photographing method may further include determining a photographing magnification according to a size of the user-selected local area to capture the subject according to the photographing magnification and transmit the photographing magnification to the another image photographing apparatus.

The image photographing method may further include in response to a continuous photographing command being input, displaying the first live view, controlling the another image photographing apparatus to perform continuous photographing, and storing a generated continuous captured image.

The image photographing method may further include sensing a motion of the image photographing apparatus; and in response to a barrel of the another image photographing apparatus being lengthened, the subject being captured, and the motion of the image photographing apparatus meeting a threshold condition, adjusting a length of the barrel of the another image photographing apparatus.

According to an aspect of another exemplary embodiment, there is provided an image photographing system including a first image photographing apparatus including a lens having a first focal distance; and a second image photographing apparatus including a lens having a second focal distance different from the first focal distance, wherein the first image photographing apparatus is configured to capture a first image and the second image photographing apparatus is configured to capture a second image according to a photographing command, the first image photographing apparatus is configured to receive the second image captured by the second image photographing apparatus, generate a captured image by using the first and second images, and the first image photographing apparatus display the generated captured image.

The second focal distance may be longer than the first focal distance, and the first image photographing apparatus may overlap the second image with a local area of the first image to generate the captured image.

The second image photographing apparatus may further include a lens that is rotatable and detachable according to a direction of photographing, the lens comprising an image sensor.

The lens may include magnets at intervals along a radial direction thereof and rotates in the radial direction, in response to a rotation command being input that exerts a force greater than magnetic forces of the magnets.

According to an aspect of another exemplary embodiment, there is provided an image photographing method including in response to a first image photographing apparatus and a second image photographing apparatus being combined with each other and a photographing command being input, capturing images respectively through the first image photographing apparatus and the second image photographing apparatus wherein the first image photographing apparatus includes a lens having a first focal distance and the second image photographing apparatus includes a lens having a second focal distance different from the first focal distance; and generating a captured image through the first image photographing apparatus by using a plurality of images respectively captured by the first image photographing apparatus and the second image photographing apparatus and displaying the generated captured image.

According to an aspect of another exemplary embodiment, there is provided an image photographing apparatus including an image sensor; an interface; and a controller configured to control the interface to electrically connect the interface of the image photographing apparatus to an interface of another image forming apparatus, wherein the controller, in response to a photographing command, the controller is configured to control the image sensor to capture a first image of a subject and control the another image photographing apparatus to perform photographing, receive a second image from the another image photographing apparatus through the interface, and generate a captured image using the first image and the second image.

The controller may be configured to control the interface to electrically connect to the interface of the another image photographing apparatus using radio frequency communication.

The interface of the image photographing apparatus may be a Bluetooth (BT) interface or a near field communication (NFC) interface.

The photographing command may be input to the image photographing apparatus, and at a time when the photographing command is input, the image photographing apparatus is physically connected to the another image photographing apparatus.

The image photographing apparatus may further include an attachable and detachable lens that is in optical communication with the image sensor.

The image photographing apparatus may further include a display, and the controller may be configured to control the display to display the captured image on the display.

The image photographing apparatus may further include a combiner that physically connects the image photographing apparatus to the another image photographing apparatus.

The combiner may include a plurality of grooves or a plurality of protrusions.

The combiner may include a gripper that is configured to receive a portion of both the image photographing apparatus and the another image photographing apparatus.

The first image may be an image of the subject captured at a first focal distance, and the second image may be an image of the subject captured at a second focal distance that is different than the first focal distance

BRIEF DESCRIPTION OF THE DRAWINGS

The above and/or other aspects will be more apparent by describing certain exemplary embodiments with reference to the accompanying drawings, in which:

FIGS. 15A and 15B are views illustrating a rotatable and detachable lens that includes a plurality of magnets;

FIG. 22 is a sequence diagram illustrating an image photographing method using a portable phone and a cover type camera, according to an exemplary embodiment.

DETAILED DESCRIPTION OF THE EXEMPLARY EMBODIMENTS

Figure 1A:
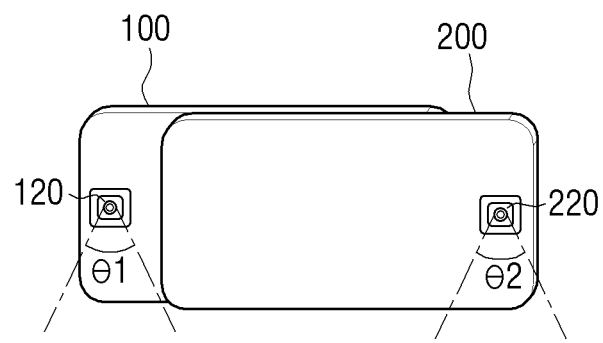
FIGS. 1A through 1D are views illustrating methods of realizing image photographing apparatuses, according to various exemplary embodiments.
Figure 1A:
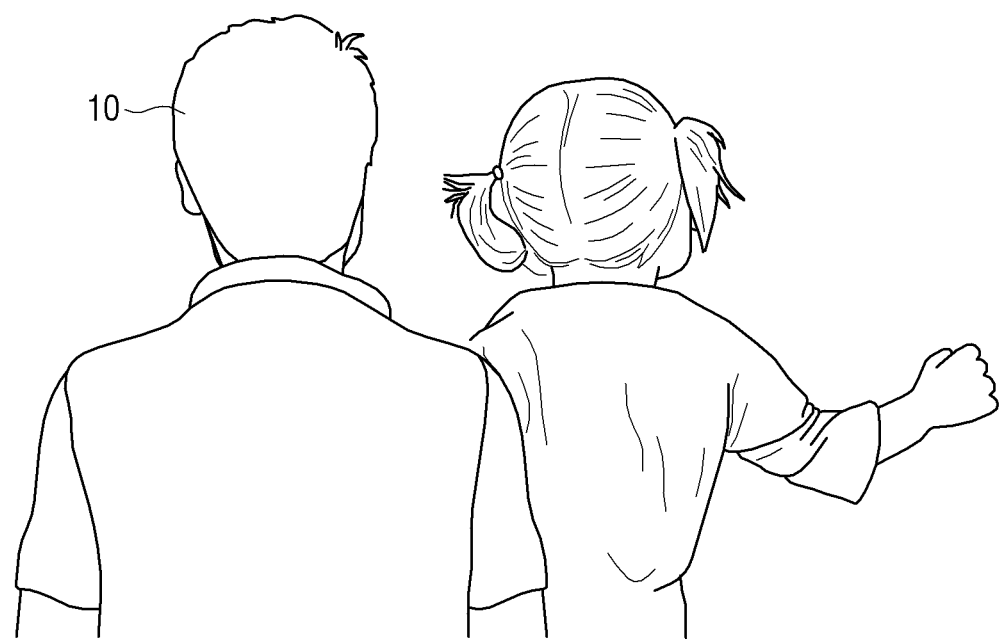

Exemplary embodiments are described in greater detail with reference to the accompanying drawings.

In the following description, the same drawing reference numerals are used for the same elements even in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, well-known functions or constructions are not described in detail since they would obscure the exemplary embodiments with unnecessary detail Also, terminology that will be described hereinafter are defined in consideration of functions in the present general inventive concept and may be changed according to intentions, customs, or the like of users or operators. Therefore, the definition of the terminology may be given based on overall contents of the present specification.

FIGS. 1A through 1D are views illustrating an image photographing method of an image photographing system, according to various exemplary embodiments. Referring to FIGS. 1A through 1D, the image photographing system may include a plurality of image photographing apparatuses that are homogenous or heterogeneous. A user may arrange the plurality of image photographing apparatuses so as to enable their photographing directions to direct toward the same subject and then perform photographing. In this case, the plurality of image photographing apparatuses may capture the subject at different viewpoints and different view angles. The image photographing system may finally generate a captured image by using a plurality of images that are respectively captured by the plurality of image photographing apparatuses.

FIG. 1A is a view illustrating image photographing apparatuses 100 and 200 that are realized as portable phones respectively including cameras 120 and 220.

A user may overlap the plurality of homogeneous image photographing apparatuses 100 and 200 with each other, as shown in FIG. 1A, to input a photographing command. As one example, connection structures (e.g., uneven structures, connection rings, or the like) may be installed to physically connect the plurality of image photographing apparatuses 100 and 200, such that the user may fixedly connect the plurality of image photographing apparatuses 100 and 200 by using the connection structures. Alternatively, as another example, in a case in which there are no particular connection structures, the user may grip the image photographing apparatuses 100 and 200 at one time with a hand to input the photographing command.

The user may connect the image photographing apparatuses 100 and 200 to each other through a wire or wireless communication interface to perform photographing by using the plurality of image photographing apparatuses 100 and 200. If the photographing command is input in this connected state, the photographing apparatuses 100 and 200 respectively perform photographing. Images that are respectively captured by the image photographing apparatuses 100 and 200 may be combined so as to generate one captured image. In this case, since viewpoints or view angles of the image photographing apparatuses 100 and 200 are different from each other, the images may be combined to generate various types of captured images. For example, an image photographing system including a plurality of image photographing apparatuses may generate a three-dimensional (3D) content. In such a case, an image captured by an image photographing apparatus positioned on a left side is determined as a left eye image, and an image captured by an imaging photographing apparatus positioned on a right side is determined as a right eye image. Alternatively, the image photographing system may generate a synthesized image where a partial area of an image captured by an image photographing apparatus using a wide-angle lens is replaced with at least a part of an image captured by an image photographing apparatus using a telephoto lens. As yet another example, the image photographing system may capture a moving image with one image photographing apparatus, and capture a still image with another image photographing apparatus, in order to generate a captured image into which the moving image and the still image are combined.

A communication connection between the plurality of image photographing apparatuses 100 and 200 may be automatically performed. For example, if a common photographing command is input from the image photographing apparatus 100 of the plurality of image photographing apparatuses 100 and 200, the image photographing apparatus 100 may search for another image photographing apparatus positioned within a distance, by using a short range communication such as Bluetooth or a near field communication (NFC), etc. In some cases, the distance may be preset. In other cases, the distance may be determined based on the communication range of the communication protocol, such as Bluetooth or NFC, etc., that is used. If the image photographing apparatus 200 is located as a result of the search, the image photographing apparatus 100 may perform a communication connection with the image photographing apparatus 200. Alternatively, if tagging is performed between the plurality of image photographing apparatuses 100 and 200, a communication connection may be automatically performed between the plurality of image photographing apparatuses 100 and 200 according to a short range communication method.

If the communication is connected between the plurality of image photographing apparatuses 100 and 200, the user may capture a plurality of images at the same time by using the plurality of image photographing apparatuses 100 and 200. In this case, if one of the plurality of image photographing apparatuses 100 and 200 includes a display, the image photographing apparatus that includes the display may display a live view or a captured image through its display. Alternatively, the user may input various types of user commands, such as a capturing command, a storage command, etc., through one of the plurality of image photographing apparatuses 100 and 200. The image photographing apparatus through which the user inputs the various types of user commands may be the same as, or different than, the image photographing apparatus that includes the display.

As described with reference to FIG. 1A, the image photographing apparatuses 100 and 200 are realized as portable phones that respectively include the cameras 120 and 220. However, this is only an exemplary embodiment, and thus the image photographing apparatuses 100 and 200 may be realized as various types of electronic devices such as a tablet PC, a digital camera, a camcorder, a personal digital assistant (PDA), an MP3, etc., that include cameras. Moreover, the various types of electronic devices may be combined. For example, the image photographing apparatus 100 may be a portable phone, and the image photographing apparatus 200 may be a tablet PC, etc.

Alternatively, one of a plurality of image photographing apparatuses may be realized as an auxiliary camera that is attached onto another image photographing apparatus to be used. In other words, the user may connect various types of image photographing apparatuses to one another to enable the image photographing apparatuses to perform photographing in the same direction. An example of an image photographing system including various types of image photographing apparatuses will now be described.

Figure 1B:
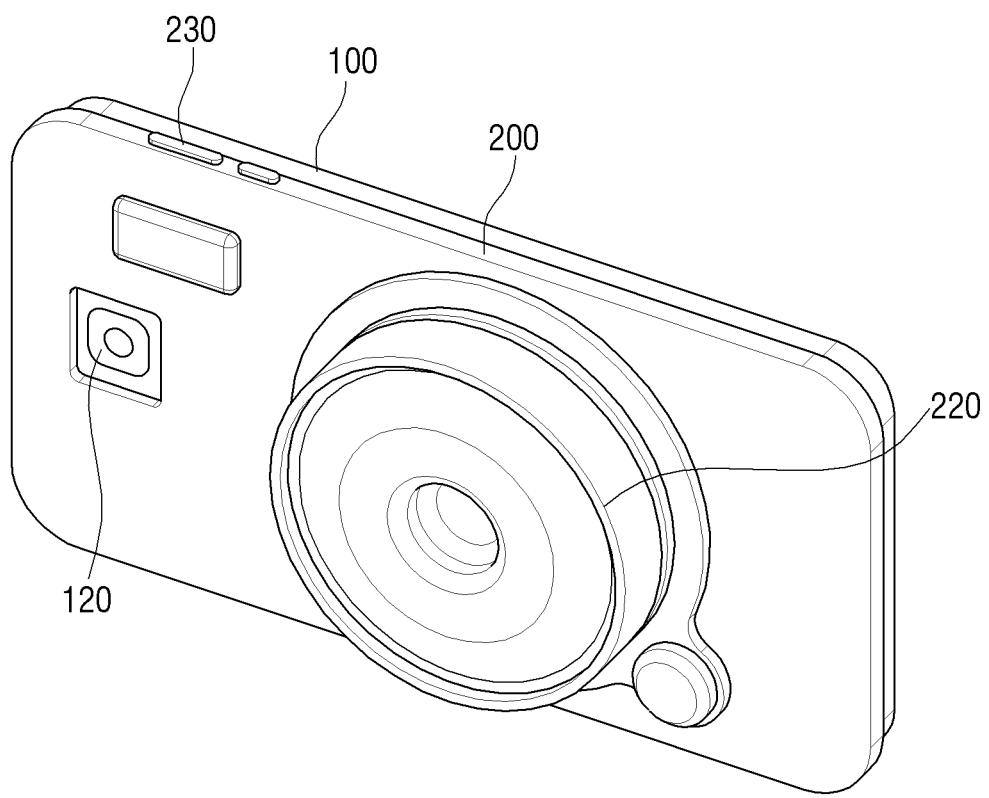

FIG. 1B illustrates a structure of an image photographing system including heterogeneous image photographing apparatuses 100 and 200. Referring to FIG. 1B, a user may connect the image photographing apparatus 100 realized as a portable phone to the image photographing apparatus 200 realized as a digital camera to configure the image photographing system. The image photographing apparatus 200 of FIG. 1B may be manufactured to have a structure that may be physically combined with the image photographing apparatus 100. In other words, the image forming apparatus 200 may be manufactured to have a structure that makes physical combination with the image photographing apparatus 100 more easy. As shown in FIG. 1B, the image photographing apparatus 200 is connected to the image photographing apparatus 100 at a surface of the image photographing apparatus 100 on which the camera 120 is disposed. In this case, the image photographing apparatus 200 may be manufactured such that when a battery cover of a back surface of the image photographing apparatus 200 is removed, the image photographing apparatus 200 may be connected to the image photographing apparatus 100 by using a connection structure formed between the battery cover and a main body of the image photographing apparatus 200. For example, the connection structure may include ribs, snaps, guides, tabs, and protrusions, and the like. For convenience of description, this type of image photographing apparatus is referred to as a cover type image photographing apparatus. The cover type image photographing apparatus will be described in detail later.

If the user performs photographing when the plurality of image photographing apparatuses 100 and 200 are connected to each other as shown in FIG. 1B, the plurality of image photographing apparatuses 100 and 200 respectively perform photographing by using the cameras 120 and 220. For example, the image photographing apparatus 200 may be provided with a shutter button 230, and the user may perform photographing by depressing the shutter button 230. An image captured by the image photographing apparatus 200 is transmitted to the image photographing apparatus 100. The image photographing apparatus 100 generates one captured image by using a first image that is directly captured by the image photographing apparatus 100 and a second image that is captured by the image photographing apparatus 200. As described above, a captured image may be formed in various forms according to exemplary embodiments, and thus a repeated description thereof is omitted. Moreover, alternatively, the image may be transmitted in the opposite direction. That is, the image captured by the image photographing apparatus 100 may be transmitted to the image photographing apparatus 200, and the image photographing apparatus 200 may generate the one captured image.

Figure 1C:
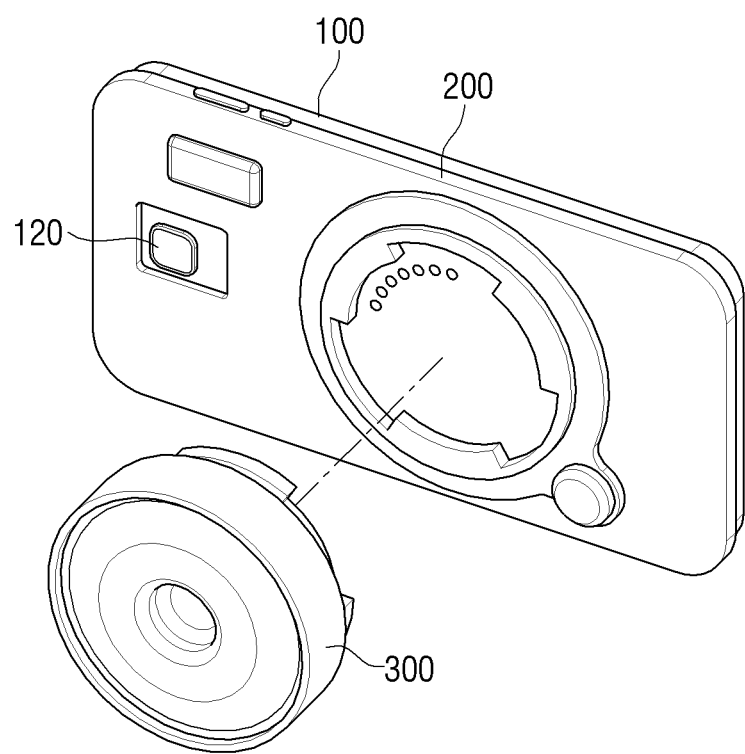

The image photographing apparatus 200 of FIG. 1B may have a structure in which a lens is detachable from the image photographing apparatus 200. FIG. 1C illustrates a structure that connects the image photographing apparatus 200 using a detachable lens 300 to the image photographing apparatus 100. The user may change the lens 300 into various types of lenses according to a type, a photographing magnification, etc. of a captured image to attach the changed lens 300 onto the another image photographing apparatus 200. For example, a telephoto lens may be attached onto the another image photographing apparatus 200. Therefore, performances of the image photographing apparatus 100 and the another image photographing apparatus 200 may be variously changed to realize various kinds of photographing effects.

The image photographing system where the plurality of image photographing apparatuses 100 and 200 are realized as independent types has been exemplarily described above. However, the image photographing system may be realized as a structure in which one image photographing apparatus includes a plurality of cameras.

Figure 1D:
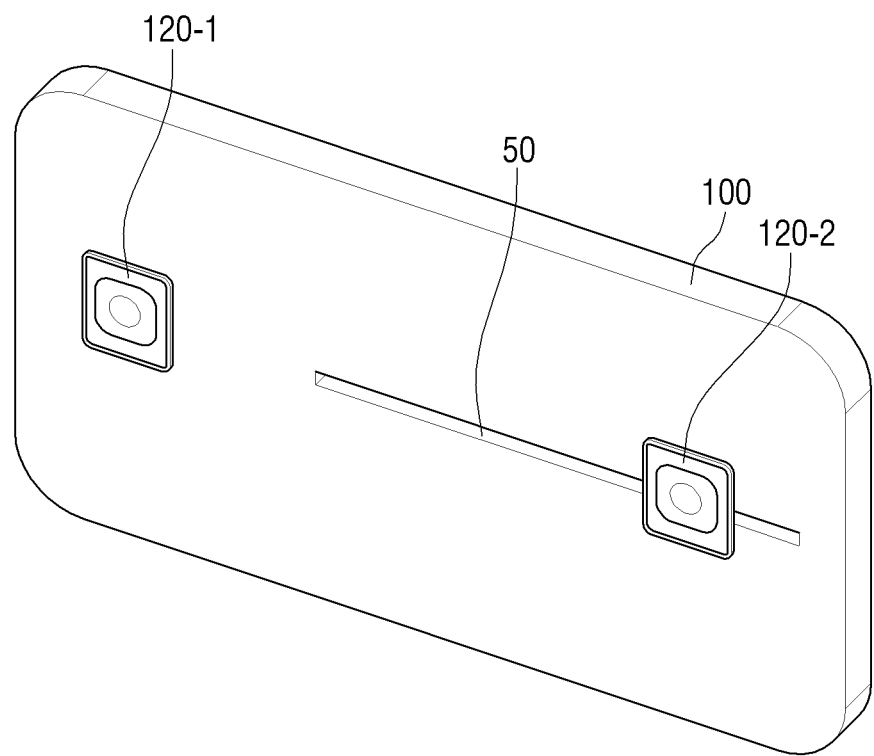

FIG. 1D illustrates a structure of an image photographing apparatus 100 according to an exemplary embodiment. Referring to FIG. 1D, the image photographing apparatus 100 includes a plurality of cameras 120-1 and 120-2.

The camera 120-1 may be fixed into the image photographing apparatus 100, and the camera 120-2 may be movable. In other words, a groove 50 may be formed in one surface of the image photographing apparatus 100. The camera 120-2 may be moved along the groove 50.

The user may check images captured by the cameras 120-1 and 120-2 on a live view while adjusting a position of the camera 120-2. Therefore, the user may generate a captured image corresponding to an intention of the user.

The cameras 120-1 and 120-2 of FIG. 1D may be realized as the same type of cameras. However, according to another exemplary embodiment, the cameras 120-1 and 120-2 may have different specifications such as types, photographing magnifications, focal distances, view angles, etc. For example, the camera 120-1 may include a wide-angle lens having a relatively short focal distance, and the camera 120-2 may include a telephoto lens having a relatively long focal distance.

Besides these, the user may build one image photographing system by using various types of image photographing apparatuses to capture an image. According to various exemplary embodiments, as shown in FIGS. 1A through 1C, image photographing apparatuses that are realized as independent apparatuses may be physically connected to each other. In this case, the image photographing apparatuses may perform communications with each other to transmit or receive data such as a photographing command and various types of user commands, images, etc. Alternatively, according to another exemplary embodiment, image photographing apparatuses may be realized as a plurality of cameras in a single image photographing apparatus.

Figure 2:
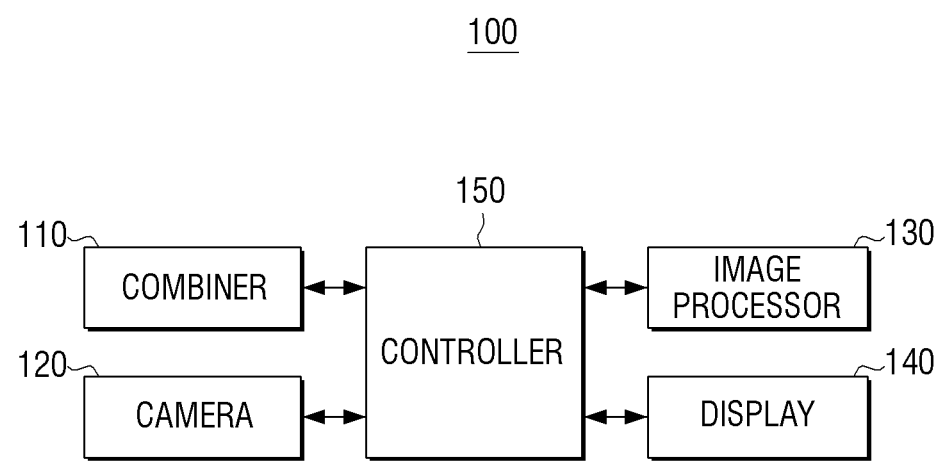
FIG. 2 is a schematic block diagram illustrating a structure of an image photographing apparatus according to an exemplary embodiment.

FIG. 2 is a block diagram illustrating a structure of an image photographing apparatus according to an exemplary embodiment. For convenience of description, an image photographing apparatus 100 of FIG. 2 is denoted by the same reference numeral as the image photographing apparatus 100 described above. However, a the image photographing apparatus 200 may also be formed to have a structure as shown in FIG. 2.

Referring to FIG. 2, the image photographing apparatus 100 includes a combiner 110, a camera 120, an image processor 130, a display 140, and a controller 150. As described above, the image photographing apparatus 100 may be realized as various types of electronic devices such as a smartphone, a portable phone, a tablet PC, a digital camera, a camcorder, a notebook PC, a PDA, an MPC, etc.

The combiner 110 is an element for connecting the image photographing apparatus 100 to another image photographing apparatus. The another image photographing apparatus may not be of the same type as the image photographing apparatus 100 and may be realized as a different type of image photographing apparatus from the image photographing apparatus 100 according to exemplary embodiments.

In particular, the combiner 110 may be a structure with which the another image photographing apparatus or a battery cover is selectively detachably combined. In other words, the battery cover may be detachably combined with the image photographing apparatus 100 through the combiner 110. Also, if the battery cover is removed from the combiner 110, the another image photographing apparatus may be detachably combined with the image photographing apparatus 100 through the combiner 110.

The image photographing apparatus 100 may exchange a user command, such as a photographing command or an image capturing command, with the another image photographing apparatus. In other words, if the image photographing apparatus 100 and the another image photographing apparatus are physically connected to each other through the combiner 110, the image photographing apparatus 100 may connect a communication session with the another image photographing apparatus.

The camera 120 is an element that captures an image. If a photographing command is input, the image photographing apparatus 100 may capture a subject through the camera 120.

The camera 120 includes a lens, a shutter, an aperture, a solid-state imaging device, an analog front end (AFE), and a timing generator (TG). The lens may have an arbitrary focal distance. In particular, the lens may be a wide-angle lens having a focal distance between about 11 mm and about 35 mm. The shutter adjusts a time when light reflected from a subject is incident onto the image photographing apparatus 100. The aperture mechanically increases or decreases a size of an opening through which light is incident, in order to adjust an amount of light incident onto the lens. If light reflected from the subject is accumulated as photo charges, the solid-state imaging device outputs an image formed by the photo charges as an electrical signal. The TG outputs a timing signal for reading out pixel data of the solid-state imaging device, and the AFE samples and digitizes the electrical signal output from the solid-state imaging device. Detailed descriptions of the above elements will be described later.

The image processor 130 is an element that processes an image. The image processor 130 may perform various types of image processing operations such as a live view generation, an image resolution adjustment, scaling, a color and contrast adjustment, a pixel interpolation, cutting, overlapping, etc. The image processor 130 may generate a captured image by using a first image captured by the camera 120 and a second image captured by another image photographing apparatus. The generated captured image may be a live view or a captured image.

If the first and second images described above may be images that are captured through lenses having different focal distances, the image processor 130 may overlap the first and second images with each other to generate the captured image.

In detail, if a first focal distance that is a focal distance of a lens of the camera 120 is shorter than a second focal distance that is a focal distance of a lens of another image photographing apparatus, the image processor 130 may generate a captured image where a second image captured by the another image photographing apparatus overlaps with a local area of a first image captured through the camera 120.

Also, if the second image overlaps in the local area of the first image, the image processor 130 may generate the captured image including a border line for discriminately displaying the first and second images.

If an arbitrary local area is selected from a first live view according to a user manipulation when the first image is displayed on a live view, the image processor 130 may overlap the second image captured by the another image photographing apparatus with a local area of the first live view to generate a live view.

The display 140 is an element that displays the captured image, various types of user interfaces (UIs), etc. The display 140 may display the captured image that is generated by the image processor 130. The display 140 may display the captured image as a live view or a still view. The display 140 may display a captured image or a stored image that has been stored in a storage.

The controller 150 is an element that controls an overall operation of the image photographing apparatus 100. In particular, the controller 150 may control the image processor 130 to generate a captured image by using images captured by a plurality of image photographing apparatuses.

As described above, if the image photographing apparatus 100 is connected to another image photographing apparatus to build an image photographing system, the user may input a photographing command to one image photographing apparatus for convenience of the user. In this case, the plurality of image photographing apparatuses may be configured to simultaneously perform photographing. In some exemplary embodiments, the user may input the photographing command to only one image photographing apparatus. However, in other exemplary embodiments, the user may input a photographing command to more than one image photographing apparatus. For example, a user may actuate a plurality of shutter buttons simultaneously, or the user may actuate the plurality of shutter buttons at different timings to achieve different effects.

For example, if a photographing command is input through an inputter for inputting the photographing command, such as a photographing button or a touch screen of the image photographing apparatus 100, the controller 150 may control the camera 120 to capture a subject and transmit the photographing command to another image photographing apparatus.

Alternatively, the photographing command may be input through the another image photographing apparatus. In this case, if the photographing command is received from the another photographing apparatus by the image photographing apparatus 100, the controller 150 may control the camera 120 to capture the subject.

The controller 150 of the image photographing apparatus 100 may control the display 140 to display a first image captured by the camera 120 as a live view, receive an image captured by the another image photographing apparatus, and overlap the image with a local area of the first image to display the overlapped image as a live view. Alternatively, the controller 150 may display a first image captured by the camera 120 as a still view, receive an image captured by the another image photographing apparatus, and overlap the image with a local area of the first image to display the overlapped image.

In particular, if an image is captured through a lens of the another image photographing apparatus having a different focal distance from a focal distance of a lens of the camera 120 of the image photographing apparatus 100, the controller 150 of the image photographing apparatus 100 may control to overlap an image captured through a lens having a short focal distance with an image captured by a lens having a long focal distance so as to display the overlapped image.

For example, a lens of the camera 120 may be a wide-angle lens, and a lens of the another image photographing apparatus may be a telephoto lens. In this case, the controller 150 of the image photographing apparatus 100 may overlap an image captured through the telephoto lens with a local area of an image captured through the wide-angle lens and display the overlapped image.

Also, if a command for capturing an image is input and transmitted through the another image photographing apparatus, the controller 150 of the image photographing apparatus 100 may capture an image that is displayed as a live view.

If the display 140 of the image photographing apparatus 100 is realized as a touch screen, and the first image is touched on the captured image, in which the first and second images overlap with each other, the controller 150 may control the display 140 to display the first image on a whole area of the display 140. If the second image is touched on the captured image, the controller 150 may control the display 140 to display the second image on the whole area of the display 140.

Also, if a user command for adjusting a magnification of the captured image is input, the controller 150 may adjust a photographing magnification of the camera 120. The controller 150 of the image photographing apparatus 100 may also transmit the input photographing magnification to the another image photographing apparatus.

If the display 140 displays the first image captured by the camera 120 as a first live view, and an arbitrary local area is selected from the first live view according to a user manipulation, the controller 150 of the image photographing apparatus 100 may control the image processor 130 to overlap a second live view captured by the another image photographing apparatus with the selected local area.

In other words, the controller 150 may control the camera 120 to calculate a photographing magnification according to a size of the selected local area and capture the subject according to the calculated photographing magnification. Also, the controller 150 of the image photographing apparatus 100 may also control to transmit the calculated photographing magnification to the another image photographing apparatus.

The user may easily capture an image by using different lenses, in particular, lenses having different focal distances, through the image photographing apparatus 100 as described above.

A method of connecting a plurality of image photographing apparatuses to each another to perform photographing will now be described in detail.

Figure 3:
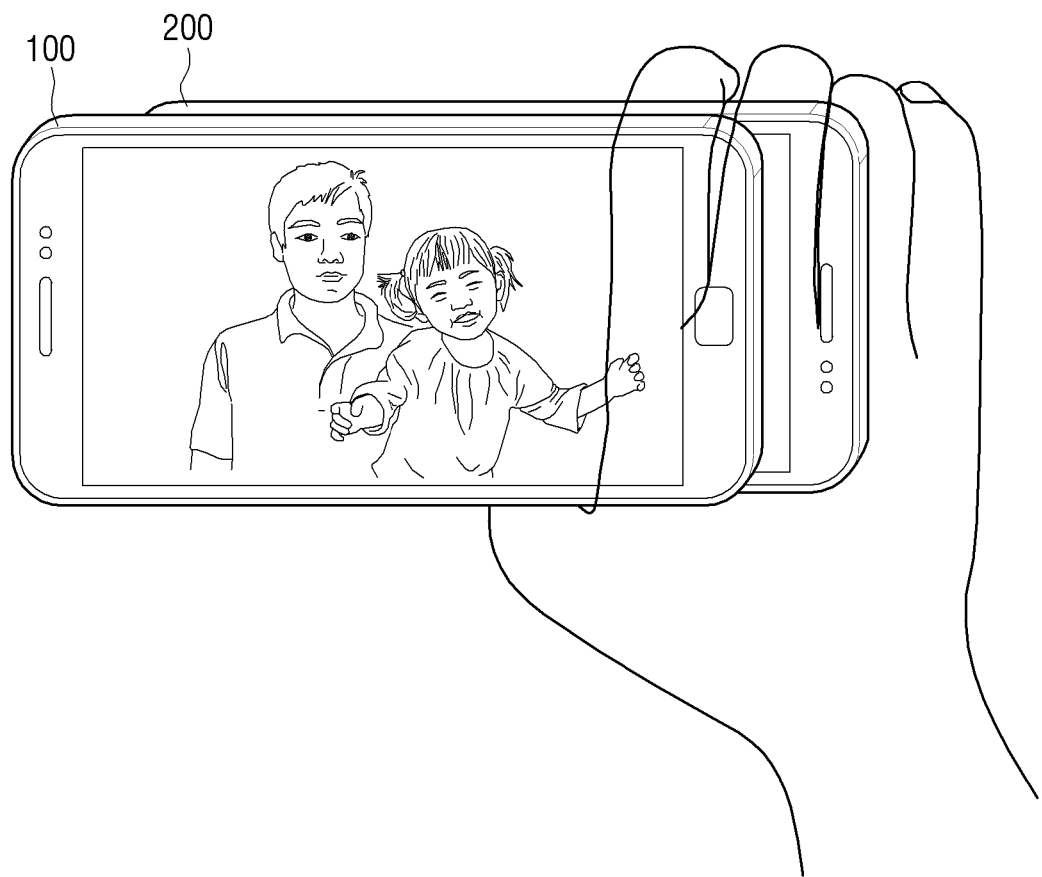
FIG. 3 is a view illustrating a method of combining a plurality of image photographing apparatuses to capture a subject, according to an exemplary embodiment.

As shown in FIG. 3, if a plurality of image photographing apparatuses 100 and 200 realized as portable phones are used, a user may arrange cameras of the plurality of image photographing apparatuses 100 and 200 to enable the cameras to perform photographing in the same direction so as to perform photographing. Here, the plurality of image photographing apparatuses 100 and 200 may be connected to each other through a communication connection, such as a Bluetooth communication, an NFC, or the like, to perform communications.

In other words, if the another image photographing apparatus 200 approaches the image photographing apparatus 100 within a communicable distance (e.g., about 10 cm) of the image photographing apparatus 100, the image photographing apparatus 100 may sense the another image photographing apparatus 200 and display a user interface (UI) for asking the user about whether to perform a connection.

A search for the another image photographing apparatus 200 may be made according to various methods. For example, the image photographing apparatus 100 may generate a query signal for asking about whether other devices in range desire to connect and then broadcast the query signal parametrically. Peripheral apparatuses that receive the query signal may transmit response signals to the query signal. If a response signal is received, the image photographing apparatus 100 may detect apparatus information included in the response signal to determine which apparatus is connectable. However, this is only one example, and other connection methods may be used.

Figure 4A:
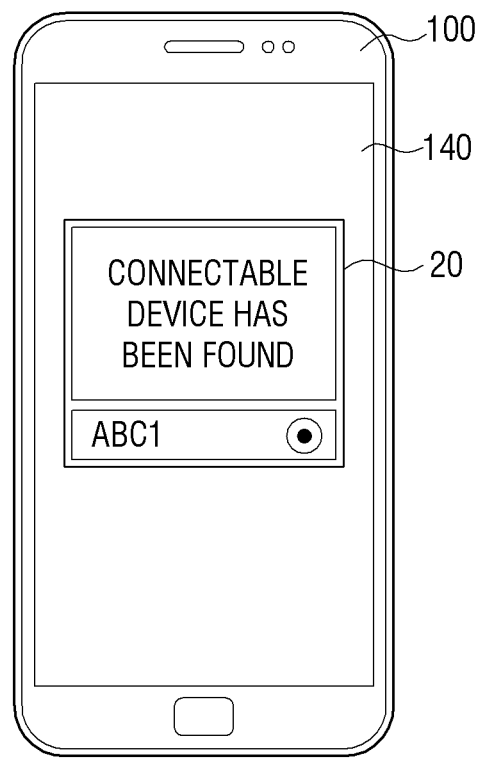
FIGS. 4A and 4B are views illustrating a user interface (UI) that is displayed to connect an image photographing apparatus to another image photographing apparatus.
Figure 4B:
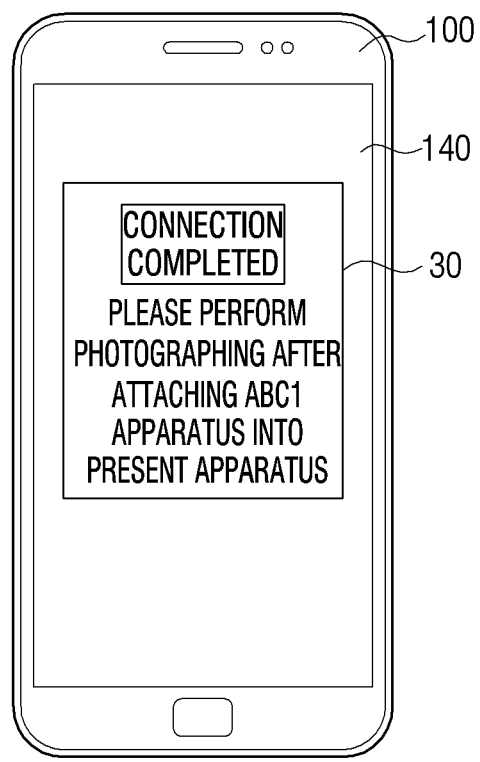

FIGS. 4A and 4B is a view illustrating a user interface (UI) that is displayed if an image photographing apparatus 100 determines a connectable apparatus is within range. FIG. 4B is a view illustrating a UI that is displayed upon successfully completion of a connection to the connectable apparatus. As shown in FIG. 4A, the image photographing apparatus 100 may display a UI 20 having a list of connectable apparatuses together with an indication that connectable apparatuses are present. For example, the UI 20 may include a sentence "A connectable apparatus has been found."

A user may select an apparatus, which is to be connected, from the list of connectable apparatuses. If the apparatus which is to be connected is selected, the image photographing apparatus 100 may connect to the corresponding apparatus. In detail, the image photographing apparatus 100 may acquire a subsystem identification (SSID), an encryption key, etc. of the corresponding apparatus through a short range wireless communication method and transmit a communication session connection request.

Therefore, as shown in FIG. 4B, if a connection is successfully established, the image photographing apparatus 100 may display a UI 30 for informing the user that the communication connection is completed. For example, as shown in FIG. 4B, the image photographing apparatus 100 may display sentence "Connection has been completed." and "Please, perform photographing after attaching this apparatus onto apparatus ABC1". "ABC1" may be a serial number or a name of the apparatus to which the connection has been established.

The user may overlap a plurality of image photographing apparatuses with each other according to the sentence and grip the overlapped image photographing apparatuses to perform photographing.

As described with reference to FIGS. 4A and 4B, after a connection is established, the user may overlap a plurality of image photographing apparatuses with each other, and grip and use the overlapped image photographing apparatuses. However, according to another exemplary embodiment, the image photographing apparatus 100 may include an interface formed in an outer surface of the image photographing apparatus 100 to electrically connect the image photographing apparatus 100 to another image photographing apparatus. In such as case, an image photographing system may be formed through an act of the user of overlapping the plurality of image photographing apparatuses with each other so as to enable interfaces respectively included in the plurality of image photographing apparatuses to contact each other, without connecting wireless communications between the plurality of image photographing apparatuses. The user may then grip the overlapped image photographing apparatuses and perform photographing.

Also, the user may overlap the plurality of image photographing apparatuses so as to enable positions of the interfaces respectively included in the plurality of image photographing apparatuses to contact each other. The user may then grip the plurality of image forming apparatuses to perform photographing. However, in other exemplary embodiments, the plurality of image photographing apparatuses may include combiners for combining the plurality of image photographing apparatuses with each other. A plurality of image photographing apparatuses that transmit and receive data through interfaces and include combiners to be combined with each other according to an exemplary embodiment will now be described.

Figure 5A:
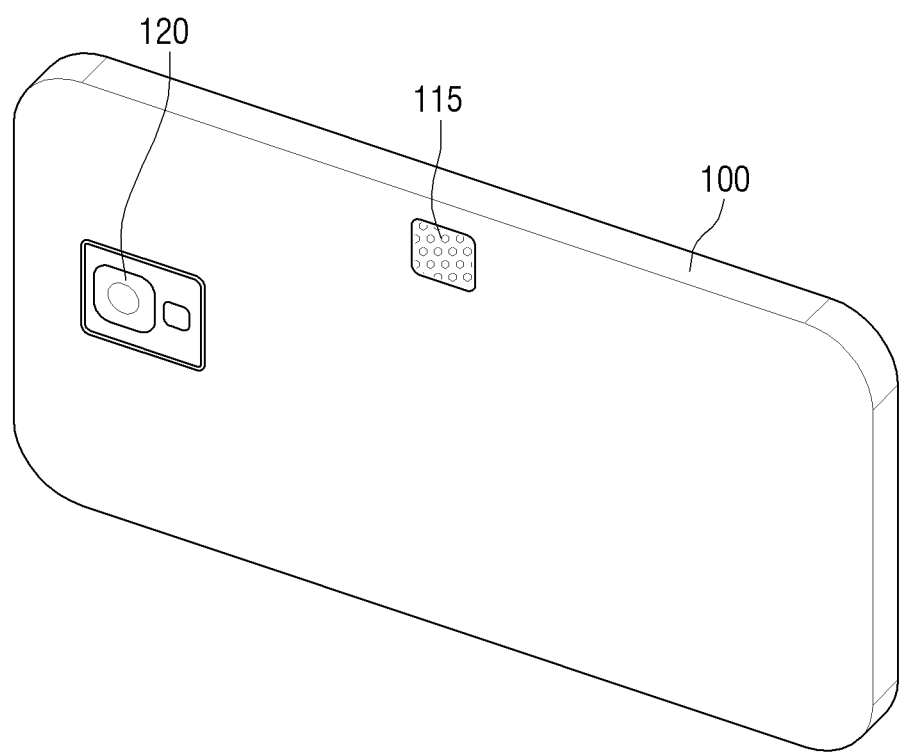
FIG. 5A is a view illustrating an image photographing apparatus that includes an interface installed in a surface of the image photographing apparatus, to be connected to another photographing apparatus.

FIG. 5A is a view illustrating an image photographing apparatus including an interface. As shown in FIG. 5A, an image photographing apparatus 100 includes an interface 115 that is formed in an outer surface of the image photographing apparatus 100. Referring to FIG. 5A, in the image photographing apparatus 100, the interface 115 may be formed in the same surface as that in which the camera 120 is formed. Therefore, the user may attach the image photographing apparatus 100 onto another image photographing apparatus to enable an interface formed in the another image photographing apparatus to face the interface 115 in order to perform photographing.

Figure 5B:
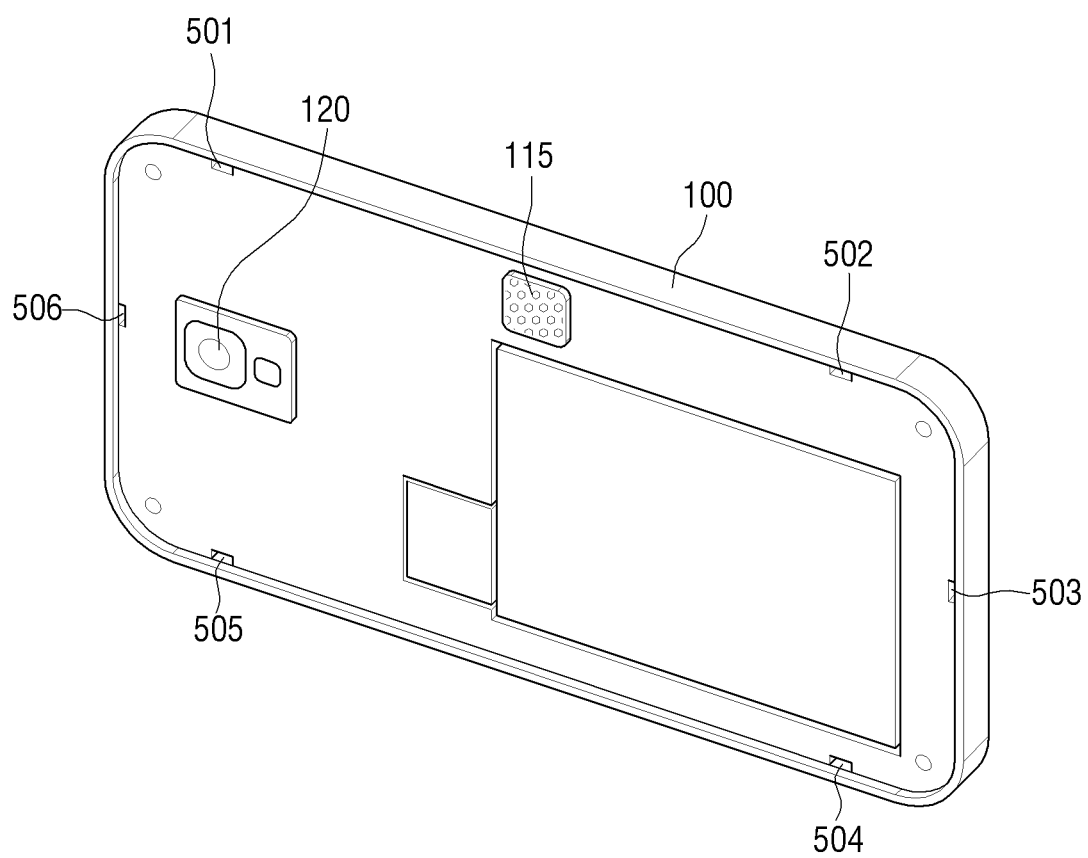
FIG. 5B is a view illustrating an image photographing apparatus from which a cover attached onto a surface of the image photographing apparatus is removed.

The image photographing apparatus 100 may include a combiner 110 (see FIG. 2) that may be selectively combined with a battery cover or with the another image photographing apparatus. In detail, the combiner 110 of the image photographing apparatus 100 may be realized as grooves that may be bound to a plurality of protrusions formed on the battery cover. In other words, as shown in FIG. 5B, the combiner 110 may be realized as various types of grooves 501 through 506 that are exposed when the battery cover is removed from the image photographing apparatus 100. Therefore, the user may attach and/or detach protrusions of the battery cover or the another image photographing apparatus having the same protrusions onto and/or from the image photographing apparatus 100 by using a plurality of grooves 501 through 506 of the combiner 110. However, this is only an exemplary embodiment, and thus the combiner 110 may be additionally provided in various shapes in a side or a back surface of an image photographing apparatus 100.

A battery and the interface 115 may be included in the back surface of the image photographing apparatus 100 that is packaged by the battery cover. In other words, if the battery cover is removed from the image photographing apparatus 100, the interface 115 may be exposed as shown in FIG. 5B.

Figure 6:
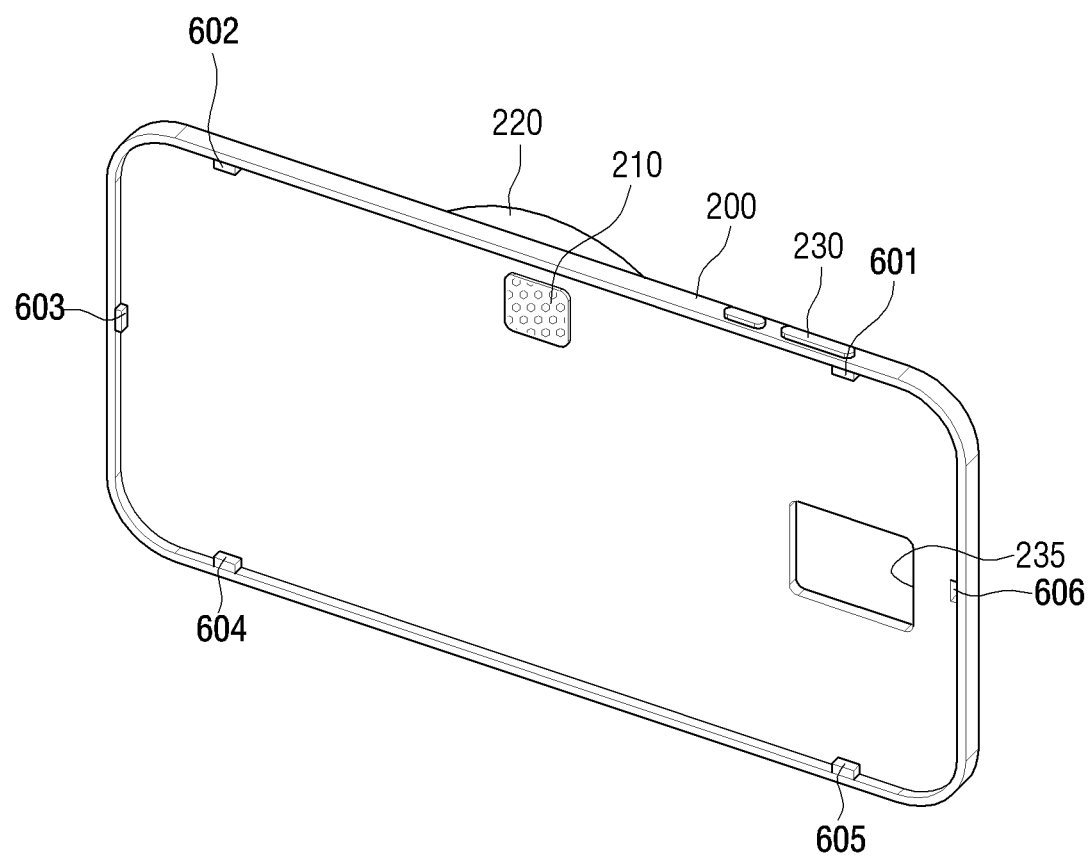
FIG. 6 is a view illustrating a second image photographing apparatus that is realized as a cover type camera to be combined with an image photographing apparatus, according to an exemplary embodiment.

FIG. 6 is a view illustrating an external back surface of an image photographing apparatus. FIG. 6 shows the external back surface of an image photographing apparatus 200 that is to be connected to the image photographing apparatus 100. The image photographing apparatus 200 may be realized as a case type that may be connected to a surface of the image photographing apparatus 100 from which a battery cover is removed, so as to replace the battery cover.

As shown in FIG. 6, the image photographing apparatus 200 may include a combiner comprising protrusions 601 through 606 having corresponding shapes to the grooves 501 through 506 of the image photographing apparatus 100 (see FIG. 5B) that are formed to be fixed on the back surface of the image photographing apparatus 100. Therefore, protrusions 601 through 606 of the image photographing apparatus 200 that protrude from the image photographing apparatus 200 may be combined with the grooves 501 through 506 of the image photographing apparatus 100 so as to fixedly connect the image photographing apparatus 100 and the image photographing apparatus 200 to each other. In other words, the image photographing apparatus 200 may be combined at a position of the image photographing apparatus 100 from which the battery cover is removed.

The image photographing apparatus 200 may include an interface 210 for being combined with the image photographing apparatus 100, a camera 220, and a shutter button 230.

The image photographing apparatus 200 may also include an opening area 235 in a position thereof corresponding to a position of the camera 120 of the image photographing apparatus 100, so as not to cover the camera 120 of the image photographing apparatus 100. Therefore, if the image photographing apparatus 100 and the image photographing apparatus 200 are combined with each other, the camera 120 of the image photographing apparatus 100 may be positioned in the opening area 235.

Also, the interface 210 of the image photographing apparatus 200 may be positioned so as to contact the interface 115 of the image photographing apparatus 100. In other words, if the image photographing apparatus 100 and the image photographing apparatus 200 are combined with each other, the interfaces 115 and 210 contact each other.

If the image photographing apparatus 100 and the image photographing apparatus 200 are connected to each other according to the above-described method, the camera 220 of the image photographing apparatus 200 may capture an image separately from the camera 120 of the image photographing apparatus 100. In particular, the camera 220 of the image photographing apparatus 200 may include a lens having a different focal distance from a lens of the camera 120 of the image photographing apparatus 100. For example, the focal distance of the lens of the camera 220 of the image photographing apparatus 200 may be longer than the focal distance of the lens of the camera 120 of the image photographing apparatus 100.

The image photographing apparatus 200 may include an inputter. The inputter may include at least one button. In other words, the button may be formed as a push type or a touch type and may include at least one of a power, a locking button, a shutter button, a menu button, a home button, a back button, and a search button. In particular, the image photographing apparatus 200 may include the shutter button 230 for capturing an image, as shown in FIG. 6.

If a user actuates the shutter button 230, the image photographing apparatus 200 may capture an image through the camera 220 and transmit an image capturing command to the image photographing apparatus 100 through the interface 115 and the interface 210.

Alternatively, if the image capturing command is input through the shutter button 230 of the image photographing apparatus 200, the image photographing apparatus 200 may transmit the image capturing command to the image photographing apparatus 100 through the interface 210 and the interface 115. Also, images may be simultaneously captured by the image photographing apparatus 100 and the image photographing apparatus 200 under control of the image photographing apparatus 200 or the image photographing apparatus 100.

Therefore, if the image capturing command is input through the shutter button 230 of the image photographing apparatus 200, images may be simultaneously captured through the cameras 120 and 220 of the image photographing apparatus 100 and the image photographing apparatus 200, respectively. In other exemplary embodiments, if the image capturing command is input through the shutter button 230 of the image photographing apparatus 200, images may be captures with a timing between the cameras 120 and 220. The timing may be preset and/or predetermined.

Figure 7A:
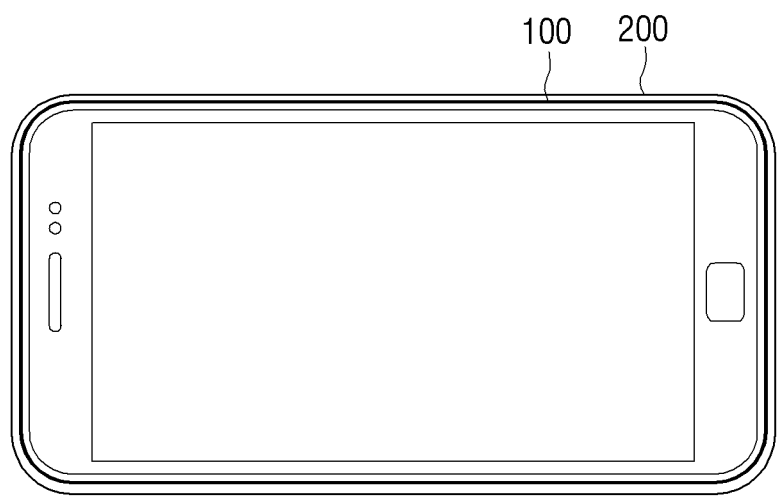
FIGS. 7A through 7C are views illustrating an image photographing system into which a plurality of image photographing apparatuses are combined.
Figure 7B:
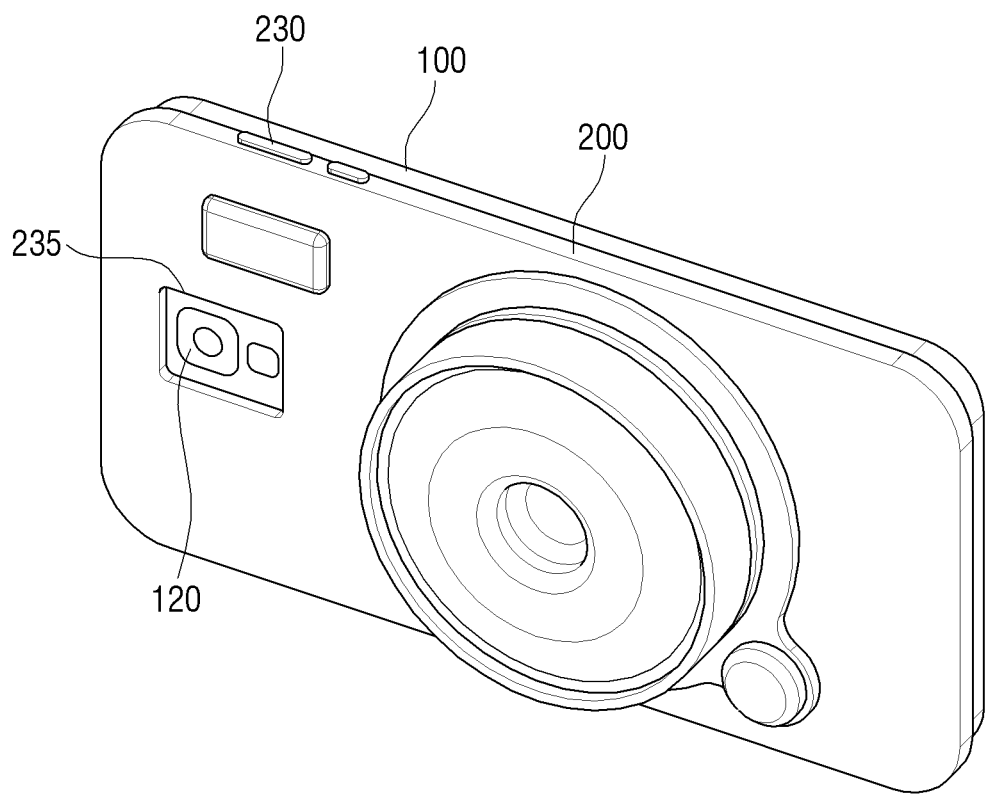
Figure 7C:
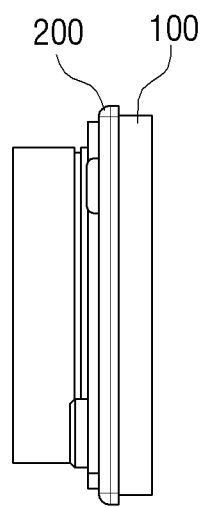

FIGS. 7A through 7C are views illustrating a plurality of image photographing apparatuses that are combined with each other, according to an exemplary embodiment.

If a battery cover of a surface of the image photographing apparatus 100 is removed, and the image photographing apparatus 100 is combined with the another image photographing apparatus 200 to form an image photographing system as described above, a surface of the combined image photographing apparatuses may be a part in which a display of the image photographing apparatus 100 is included, and an opposite surface of the combined image photographing apparatuses may be a part in which a lens of the image photographing apparatus 200 is included as shown in FIGS. 7A and 7B. Also, as shown in FIG. 7B, the camera 120 of the image photographing apparatus 100 is positioned in the opening area 235 of the image photographing apparatus 200.

Also, protrusions of the another image photographing apparatus 200 may be combined with grooves of the image photographing apparatus 100 to physically fix the image photographing apparatus 100 and the another image photographing apparatus 200 to each other.

FIG. 7C is a view illustrating a side of an apparatus into which a plurality of image photographing apparatuses are combined. As shown in FIG. 7C, a part of the image photographing apparatus 100 may be included in the image photographing apparatus 200.

As described above, through an apparatus into which a plurality of image photographing apparatuses are combined, the user may capture an image by using a plurality of cameras including lenses having different focal distances.

Figure 8:
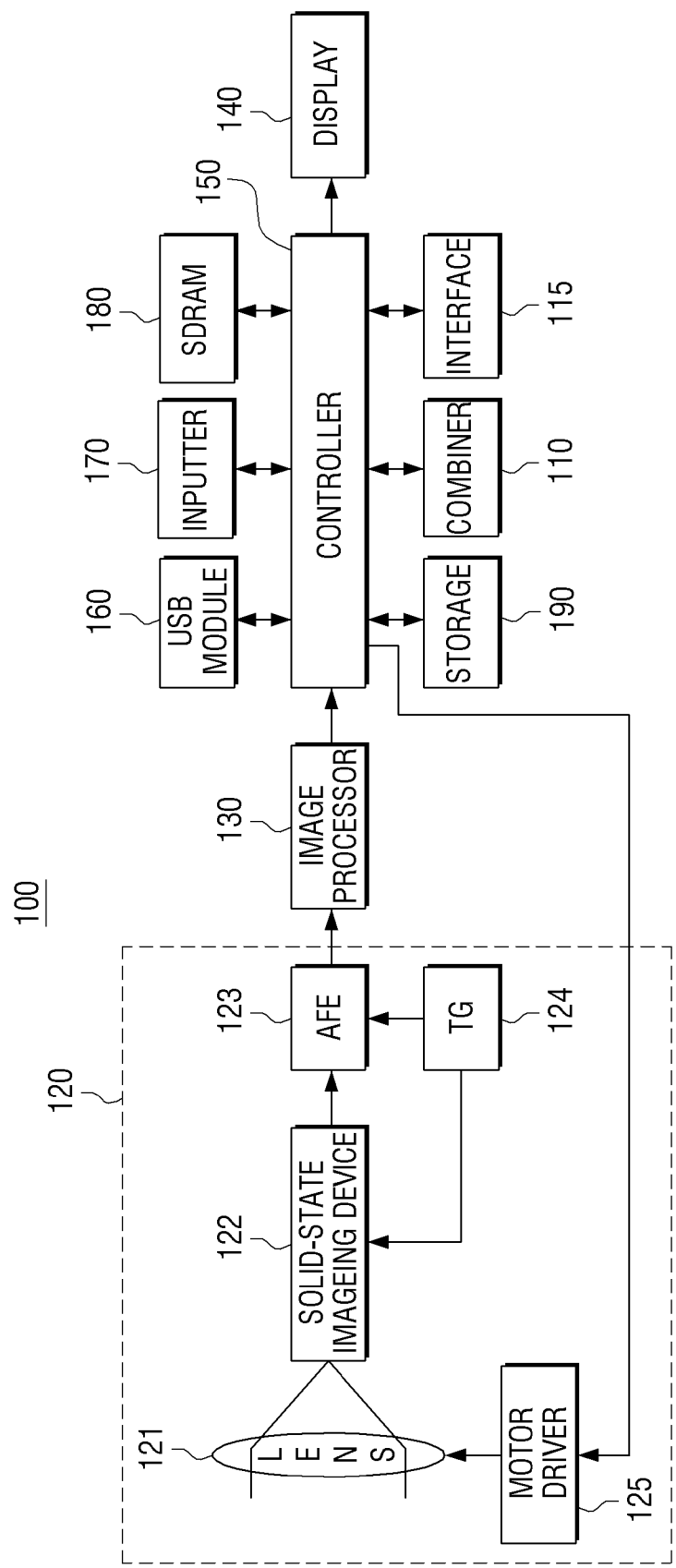
FIG. 8 is a view illustrating a structure of an image photographing apparatus according to an exemplary embodiment.

FIG. 8 is a view illustrating a detailed structure of an image photographing apparatus according to an exemplary embodiment. As shown in FIG. 8, the image photographing apparatus 100 may include the interface 115, a universal serial bus (USB) module 160, an inputter 170, a synchronous dynamic random access memory (SDRAM) 180, and a storage 190 besides the combiner 110, the camera 120, the controller 150, and the image processor 130.

In particular, the camera 120 includes a lens 121, a solid-state imaging device 122, a TG 124, an AFE 123, and a motor driver 125.

The lens 121 is an element onto which light reflected from a subject is incident. The lens 121 may include at least one of a zoom lens and a focus lens. In particular, the lens 121 may be a wide-angle lens having a relatively short focal distance. Although not shown in FIG. 8, the image photographing apparatus 100 may further include an aperture.

The aperture is an element that adjusts an amount of light incident into the image photographing apparatus 100 through the lens 121.

The solid-state imaging device 122 is an element on which an image of the subject passing through the lens 121 is formed. The solid-state imaging device 122 may include a photodiode (PD), a transmission transistor TX, a reset transistor RX, and a floating diffusion node (FD).

The TG 124 outputs a timing signal for reading out pixel data of the solid-state imaging device 122

The AFE 123 samples and digitizes an electrical signal of the subject output from the solid-state imaging device 122.

However, as described above, the AFE 123 and the TG 124 may be provided as other types of elements that may respectively replace the AFE 123 and the TG 124. In particular, if the solid-state imaging device 122 is realized as a complementary metal-oxide semiconductor (CMOS) type, the solid-state imaging device 122 may be omitted.

The motor driver 125 drives the lens 121 to adjust a focus based on information that is calculated by reading out a phase difference pixel. For example, the motor driver 125 may drive a focusing lens to adjust the focus. However, if the photographing apparatus 100 is realized as a smartphone or a cellular phone, the adjustment of the focus may be processed through software without driving the focusing lens, and thus the motor driver 125 may be omitted.

A structure of the camera 120 of the image photographing apparatus 100 described above may be similar to a structure of the camera 220 of the image photographing apparatus 200. However, a lens of the camera 220 of the image photographing apparatus 200 may be a telephoto lens having a focal distance loner than or equal to 85 mm.

The image processor 130 may include a separation circuit (not shown), an image processing circuit (not shown), a phase difference arithmetic circuit (not shown), and a Joint Photographic Experts Group (JPEG) codec (not shown).

The display 140 is an element that displays an image. In particular, the display 140 may display a live view image of the subject. The live view image may be output by processing pieces of pixel data of the solid-state imaging device 122. The display 140 may also display a still image, or a moving image.

The display 140 may also output image data that is received from an external apparatus or another image photographing apparatus, or that is stored in the storage 190. Also, the display 140 may display various types of UIs for controlling the image photographing apparatus 100.

As described above, internal elements of the image photographing apparatus 100 may be variously changed. Images that are captured by a plurality of image photographing apparatuses may be used to generate one live view or one synthesized image. If one live view is generated by using a plurality of images, and a capturing command is input by the user, a synthesized image corresponding to the live view may be generated. Methods using a plurality of images will now be described in detail.

A method of displaying a live view through the display 140 will now be described with reference to FIGS. 9A through 9C.

The image processor 130 of the image photographing apparatus 100 that is combined with the image photographing apparatus 200 may generate a live view by using a first image 910 captured by the camera 120 of the image photographing apparatus 100 and a second image 920 captured by the camera 220 of the image photographing apparatus 200.

Figure 9A:
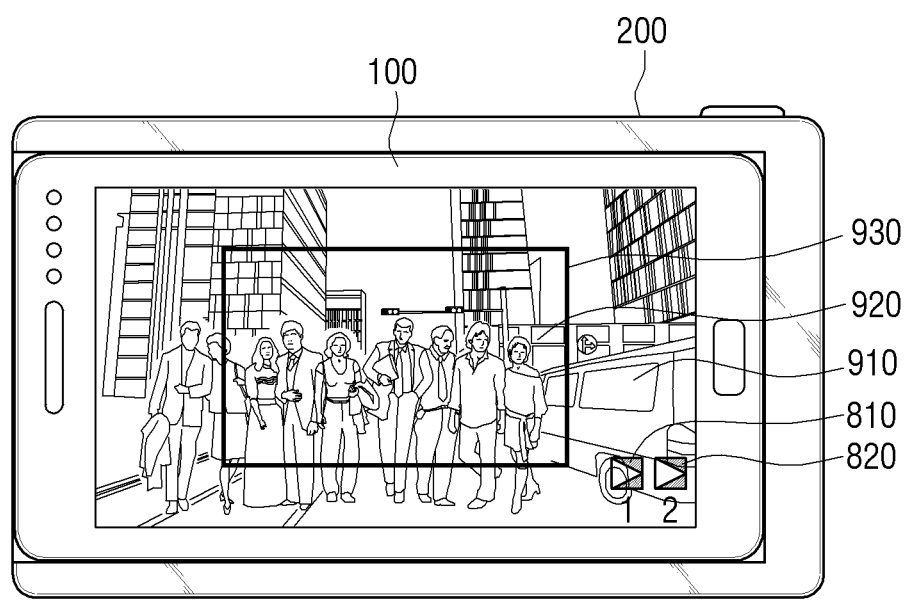
FIGS. 9A through 9C are views illustrating a method of displaying a live view on which an image photographing apparatus combines a plurality of images.
Figure 9B:
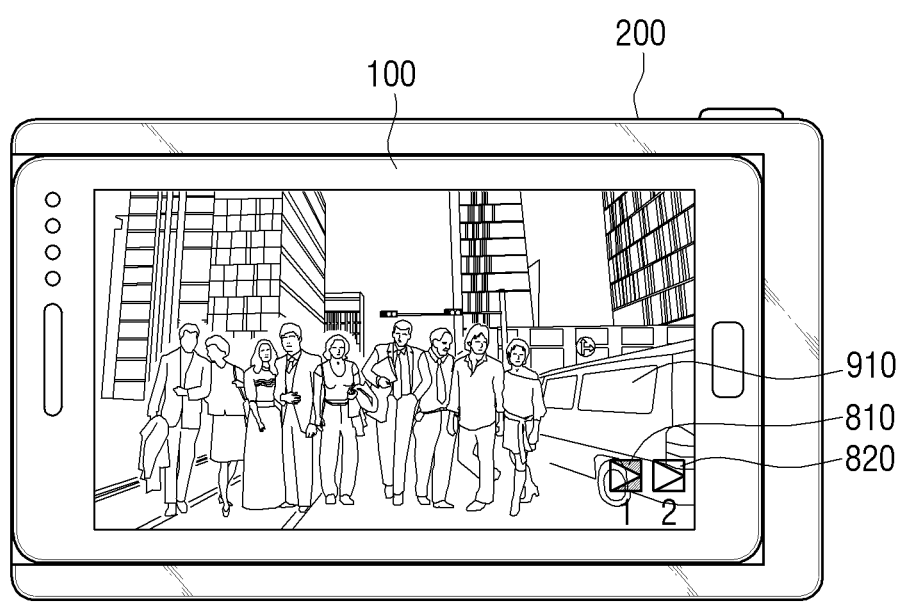

If the lens 121 (see FIG. 8) of the camera 120 of the image photographing apparatus 100 has a short focal distance, and a lens of the camera 220 of the image photographing apparatus 200 has a long focal distance, the image photographing apparatus 100 may overlap the first and second images 910 and 920 to include the second image 920 in a local area of the first image 910 and display the overlapped first and second images 910 and 920 as shown in FIG. 9A.

Also, the display 140 may display a border line 930 to display which one of the plurality of cameras 120 and 220 captures the image. The border line 930 is a graphic line indicating an outer border of a local area. Thus, in FIG. 9A, the border line 930 indicates the image taken by the camera 220 of the image photographing apparatus 200.

As described with reference to FIG. 9A, the second image 920 is included in a center inside the first image 910. However, this is only an exemplary embodiment, and thus a position of the second image 920 may be changed according to a position, etc. of the lens of the image photographing apparatus 200. Also, as shown in FIG. 9A, the second image 920 is an image whose width is long but may be an image whose height is long.

The display 140 may display icons 810 and 820 corresponding to displayed images. Since the first and second images 910 and 920 are displayed as live views as shown in FIG. 9A, the display 140 may display the icon 810 corresponding to the first image 910 and the icon 820 corresponding to the second image 920.

The user may respectively select the icons 810 and 820 to check one original image. For example, if the first icon 810 is selected, the display 140 displays only the first image 910 as shown in FIG. 9B. The controller 150 may change the display format of the first and second icons 810 and 820 in order to enable the user to intuitively recognize which image is currently displayed. For example, the controller 150 may highlight the first icon 810 corresponding to the displayed first image 910 and darkly display the second icon 820 corresponding to the second image 920 so as to enable the user to intuitively recognize that the first image 910 is currently displayed.

Figure 9C:
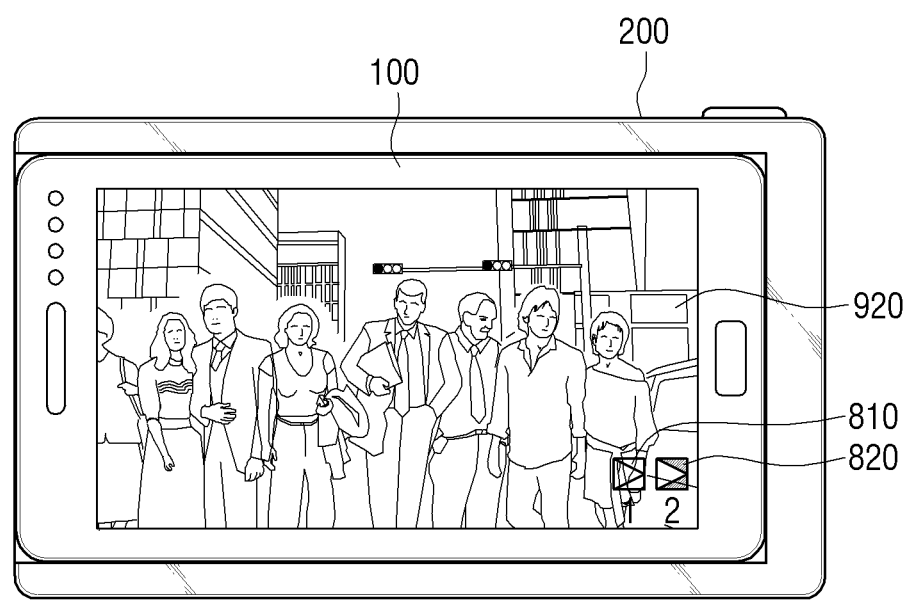

Also, if the second icon 820 is selected, the display 140 enlarges the second image 920 and displays only the enlarged second image 920 on a whole screen as shown in FIG. 9C. The controller 150 may highlight only the second icon 820 corresponding to the second image 920 and darkly display the first icon 810 corresponding to the first image 910.

The user may touch each of the first and second icons 810 and 820 to select the icon. Alternatively, in some exemplary embodiments, the user may press a button, which is separately formed in an outer surface of the image photographing apparatus 100 or the image photographing apparatus 200, to select each icon.

If the display 140 is realized as a touch screen, one image may be selected by a user command for touching an icon part corresponding to a displayed image. In other words, if the first icon 810 corresponding to the first image 910 is touched, the display 140 may display the first image 910 on the whole screen. If the second icon 820 corresponding to the second image 920 is touched, the display 140 may display the second image 920 on the whole screen.

Figure 10A:
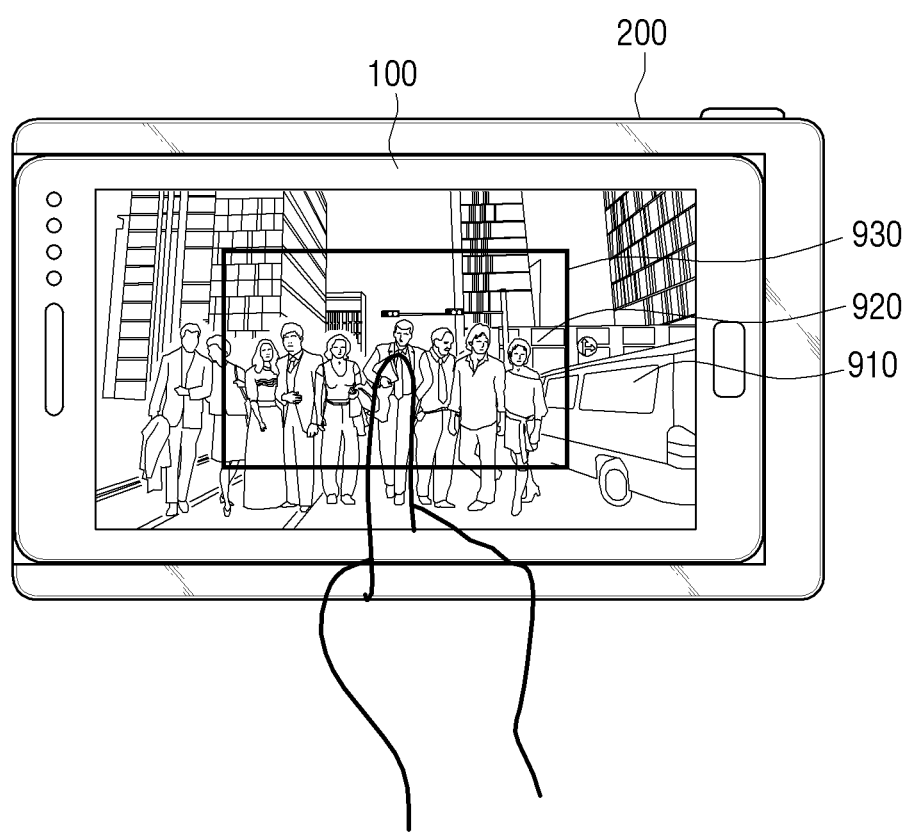
FIGS. 10A through 10C are views illustrating a method of selecting an image to be displayed or an image to be captured, through a live view by an image photographing apparatus.
Figure 10B:
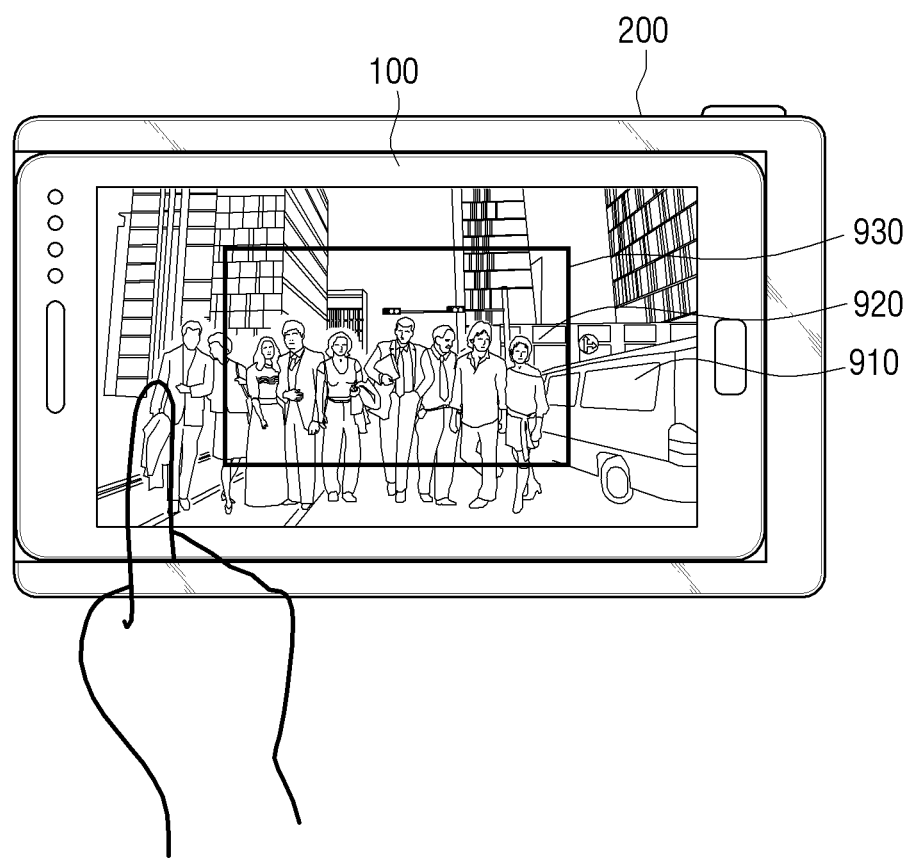
Figure 10C:
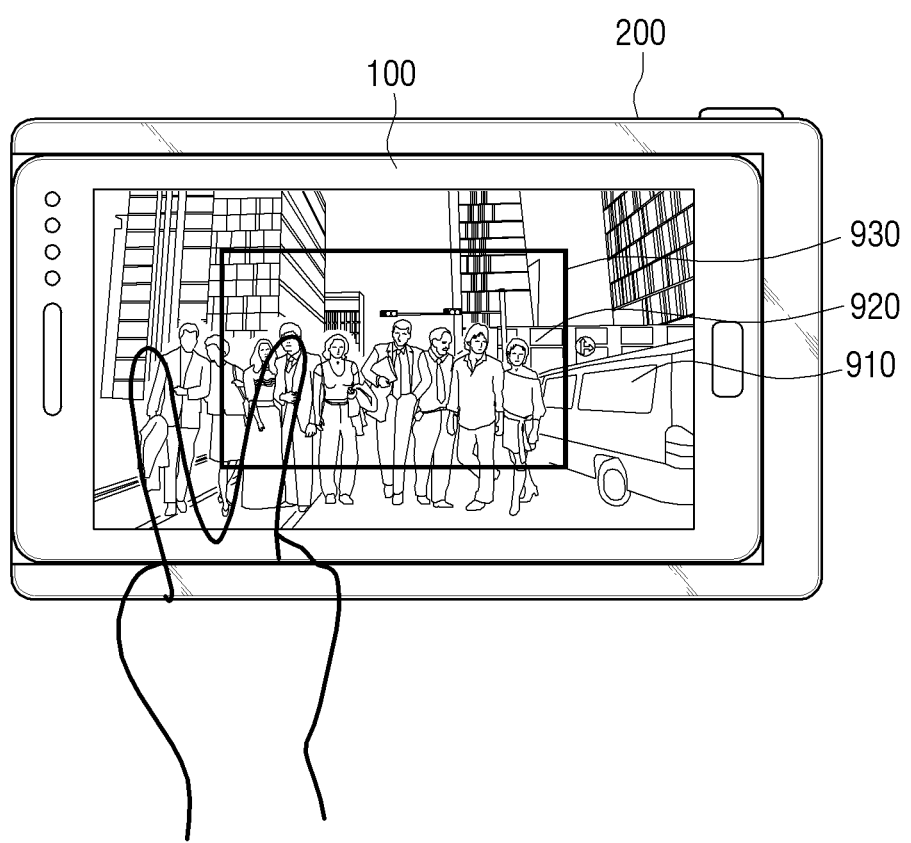

Alternatively, as shown in FIGS. 10A through 10C, one image may be selected by a command for touching a part of a displayed image. In detail, as shown in FIG. 10A, if a command for touching a part inside the border line 930 is input, the display 140 may display the second image 920 on the whole screen. Also, as shown in FIG. 10B, if a command for touching a part outside the border line 930 is input, the display 140 may display the first image 910 on the whole screen.

In some exemplary embodiments, a command for touching a part inside or outside the border line 930 may not be a user command for selecting an image to be displayed as a live view, but rather may be a user command for capturing an image.

In detail, as shown in FIG. 10A, if the part inside the border line 930 is touched, the image photographing apparatus 100 may capture the second image 920 to display a captured still image on the display 140 or store the captured image.

Also, as shown in FIG. 10B, if the part outside the border line 930 is touched, the photographing apparatus 100 may capture the first image 910 to display a captured still image on the display 140 or store the captured image.

As shown in FIG. 10C, if the parts inside and outside the border line 930 are simultaneously touched, the photographing apparatus 100 may capture an image where the first and second images 910 and 920 overlap with each other to display a captured still image on the display 140 or store the captured image.

If an image capturing command is input through the shutter button 230 formed in the outer surface of the image photographing apparatus 200, the image photographing apparatus 100 may receive the image capturing command through the interface 115 to capture a displayed live view. However, the image photographing apparatus 100 may capture an image according to a user touch command for touching the display 140.

As described above, a screen may be touched to select an image that is to be displayed as a live view or to selectively capture an image. However, this is only an exemplary embodiment, and thus the user may select at least one, which is to be captured as a moving image, from first and second images, through various types of icons displayed on the display 140.

For example, the user may set the image photographing apparatus 100 to change the number times or methods of touching various types of icons displayed on the display 140 so as to capture the first image as a moving image and the second image as a still image.

By a user command for repeatedly touching a UI for displaying a displayed image, a moving image may be captured for the first image 910, and a still image may be captured for the second image 920. Alternatively, when a live view is displayed for the first image 910, a moving image may be captured for the second image 920.

Referring to FIG. 8 again, the USB module 160 provides an interface with an external apparatus. If the image photographing apparatus 100 is connected to other external apparatuses through a USB cable or a PC, the USB module 160 processes a transmission and a reception of image data. Also, the USB module 160 processes firmware transmission and reception for upgrading firmware.

The inputter 170 is an element that receives a user input. The inputter 170 may include at least one button. The inputter 170 may also include a touch screen that is positioned in the display 140. In other words, as described above, the inputter 170 may receive a touch input for photographing or capturing an image.

The inputter 170 may receive a photographing command or an image capturing command and a user command for adjusting a magnification of a captured image.

A photographing magnification adjustment command may be a user command for pressing the button included in the image photographing apparatus 100. For example, if the inputter 170 includes upper and lower buttons, and a user command for pressing the upper button is input when a live view is displayed, a live view image may be enlarged. In other words, the image photographing apparatus 100 zooms in the lens 121 and transmits a zoom-in command through the interface 115 according to the user command. The another image photographing apparatus 200 adjusts a magnification of the lens 121 according to the received zoom-in command.

Alternatively, if a user command for pressing the lower button is input when the live view is displayed, the live view image may be reduced. In other words, the image photographing apparatus 100 may zoom out the lens 121 and transmit a zoom-out command through the interface 115 according to the user command. The image photographing apparatus 200 may receive the command and accordingly adjust the magnification of the lens of the image photographing apparatus 200 according to the received zoom-out command.

Figure 11A:
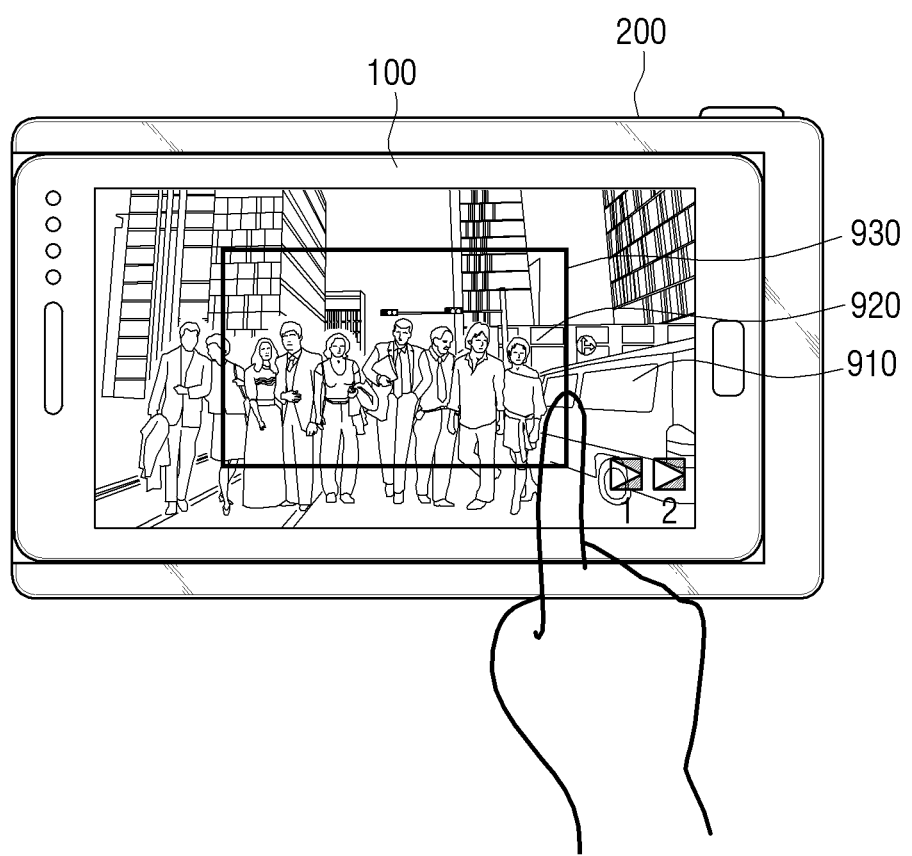
FIGS. 11A through 11C are views illustrating a method of controlling a photographing magnification of an image captured by an image photographing system into which a plurality of image photographing apparatuses are combined.
Figure 11B:
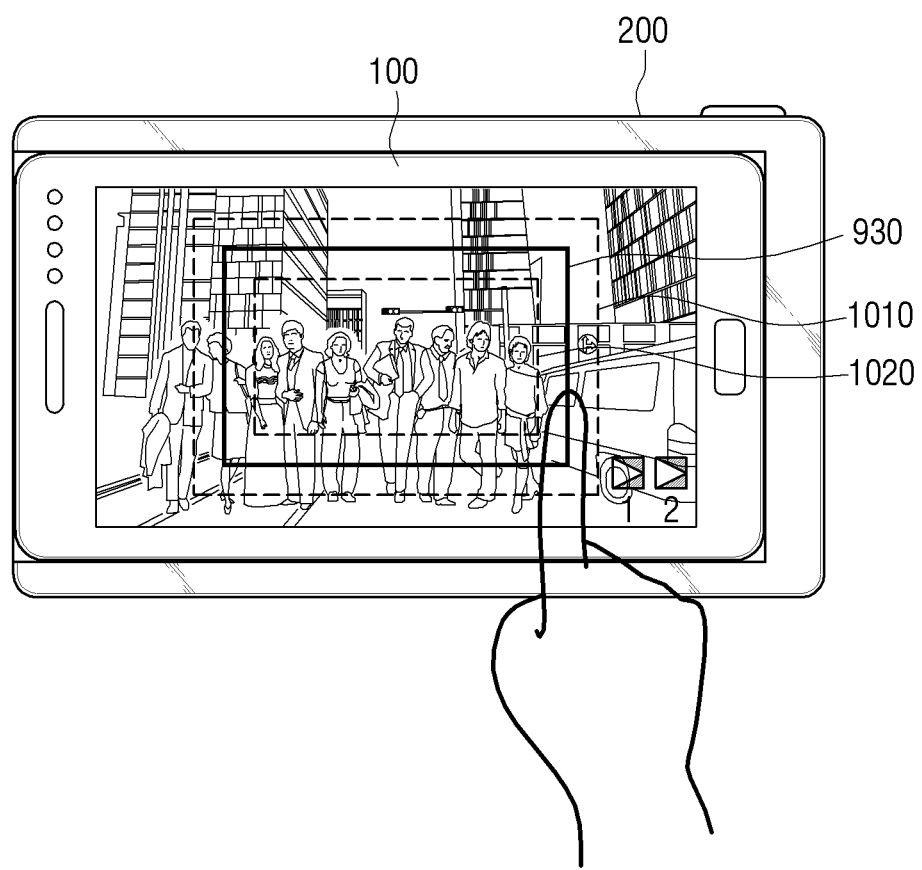
Figure 11C:
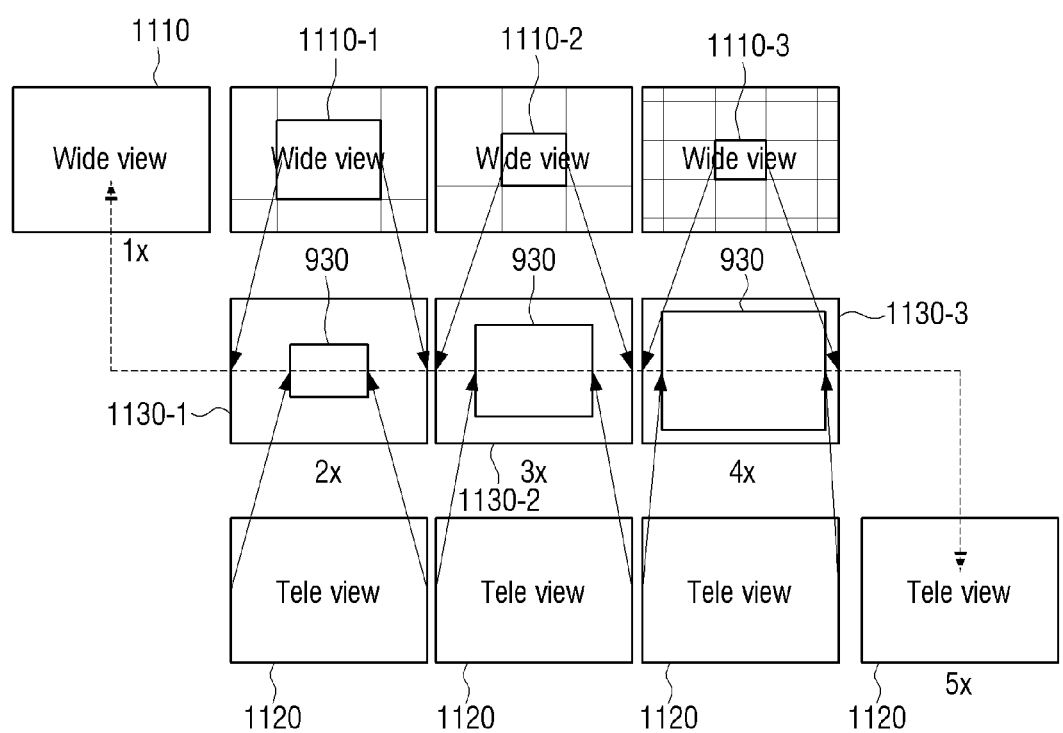

Alternatively, as shown in FIGS. 11A through 11C, the image photographing apparatus 100 may receive a user command for adjusting a magnification of a captured image through the display 140 that is realized as a touch screen.

As shown in FIG. 11A, if a user command for touching the border line 930 of a displayed live view image for a threshold time (e.g., 1 second) or more is input, the image photographing apparatus 100 may determine that a zooming command is input. The threshold time may be preset.

Also, as shown in FIG. 11B, a photographing magnification may be adjusted by a touch command of the user for adjusting a location and/or size of the border line 930.

In detail, if a user command for touching the border line 930 to stretch the border line 930 to an outer line 1010 is input, the image photographing apparatus 100 may increase the photographing magnification through the camera 120. Also, the image photographing apparatus 100 may transmit a command for increasing the photographing magnification to the image photographing apparatus 200 through the interface 115. The image photographing apparatus 200 may capture an image according to the received photographing magnification.

If a user command for touching the border line 930 to reduce the border line 930 to an inner line 1020 is input, the image photographing apparatus 100 may decrease the photographing magnification through the camera 120. Also, the image photographing apparatus 100 may transmit a command for decreasing the photographing magnification to the image photographing apparatus 200 through the interface 115. The image photographing apparatus 200 may capture an image according to the received photographing magnification.

For example, as shown in FIG. 11C, if the user gradually enlarges a size of a local area according to a user command for stretching the border line 930 positioned in a live view outside the border line 930, the photographing magnification of an image gradually becomes higher. In other words, if the user enlarges the size of the local area to double a captured image, a first image captured by the image photographing apparatus 100 is displayed as a doubled image 1130-1, and an image 1120 captured by the image photographing apparatus 200 is displayed inside the border line 930.

If the user enlarges the size of the local area to triple the captured image, the first image captured by the image photographing apparatus 100 is displayed as a tripled image 1130-2, and the image 1120 captured by the image photographing apparatus 200 is displayed inside the border line 930.

If the user enlarges the size of the local area to quadruple the captured image, the first image captured by the image photographing apparatus 100 is displayed as a quadrupled image 1130-3, and the image 1120 captured by the image photographing apparatus 200 is displayed inside the border line 930.

If the image captured by the image photographing apparatus 200 has a magnification five times a magnification of the image captured by the image photographing apparatus 100, and the user enlarges the size of the local area to enlarge the captured image fivefold, the image captured by the image photographing apparatus 200 is displayed on the whole screen.

The image processor 130 detects a first image part having a gradually reduced size from a first image (a wide view) captured by using a wide-angle lens, displays the first image part on the whole screen of the display 140, enlarges a second image (a tele view) captured by using a telephoto lens by the size of the local area, and displays the enlarged second image in a local area 930 positioned in a center of the whole screen. According to this method, a synthesized image whose magnification is adjusted may be displayed. As an area in which the second image 920 is displayed widens, the image photographing apparatus 100 may capture a subject at a high photographing magnification.

According to the above-described method, the user may easily adjust photographing magnifications of a plurality of image photographing apparatuses. Also, if the image photographing apparatus 200 includes a telephoto lens, the user may acquire an enlarged image having a high resolution rather than increase a magnification of a lens of the image photographing apparatus 100 to perform photographing.

Referring to FIG. 8 again, the SDRAM 180 is used to store an image or is used for work on an image performed by a CPU. According to an exemplary embodiment, there may be used a double data rate (DDR) SDRAM that enables outputs to come from both of a rising edge and a falling edge of a system clock in order to increase an output by two times rather than an output coming only from the rising edge.

The storage 190 includes a flash memory (not shown) and may be realized as a card type that is detachable from the image photographing apparatus 100. The storage 190 may store a captured image file. The flash memory included in the storage 190 stores a firmware program, various types of adjustment information appropriate for specifications of the image photographing apparatus 100, setup information of the image photographing apparatus 100 input by the user, the captured image file, etc.

The storage 190 may store an image that is captured according to a continuous photographing command. In particular, if the continuous photographing command is input, the image photographing apparatus 100 may display a live view captured by the camera 120 on the display 140 and transmit the continuous photographing command to the image photographing apparatus 200 through the interface 115. Also, if the image photographing apparatus 200 performs continuous photographing, the image photographing apparatus 100 may receive a continuously captured image through the interface 1150 and store the continuously captured image in the storage 190.

However, this is only an exemplary embodiment, and thus the image photographing apparatus 100 may display an image captured by the image photographing apparatus 200 as a live view, and the storage 190 may store a continuously captured image captured by the camera 120. Alternatively, the storage 190 may store images that are simultaneously continuously captured by a plurality of image photographing apparatuses.

Figure 12A:
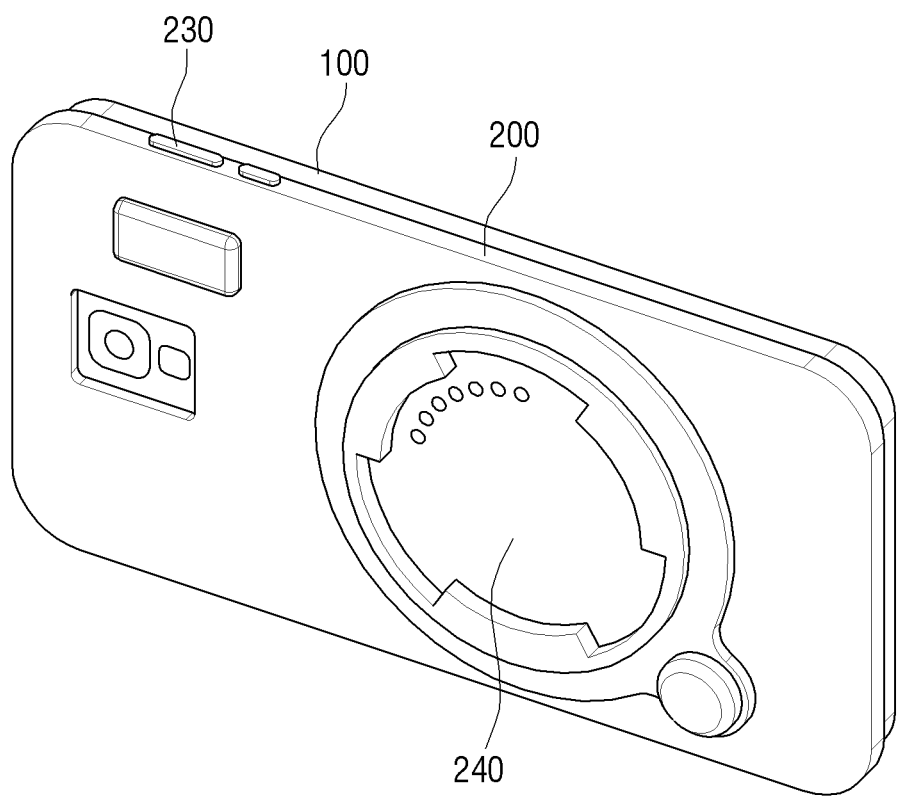
FIGS. 12A through 12C are views illustrating a detachable lens of a second image photographing apparatus.
Figure 12B:
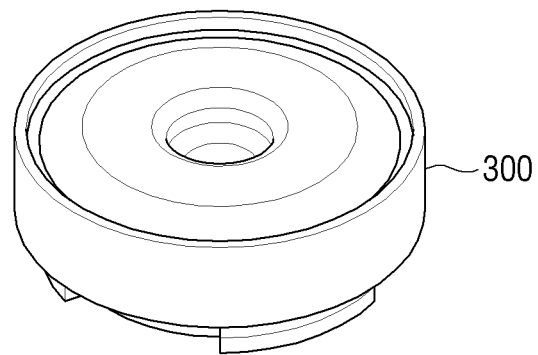
Figure 12C:
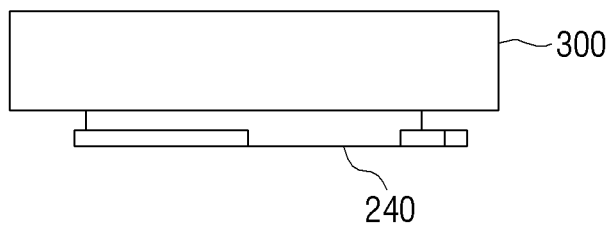

The image photographing apparatus 200 may be realized as a type whose photographing lens is detachable. FIGS. 12A and 12B are views illustrating an external structure of the image photographing apparatus 200, according to an exemplary embodiment.

Referring to FIG. 12A, the image photographing apparatus 200 may include a contact pad 240 that may be combined with a photographing lens. The contact pad 240 may be combined with various types of lenses having different photographing magnifications, focal distances, view angles, and use purposes. The contact pad 240 may include grooves that may be combined with pins of a detachable lens on a one-to-one correspondence basis. However, this is only an exemplary embodiment, and thus the contact pad 240 may be realized in a shape in which a detachable lens including an image sensor is rotatable. A detailed method of this will be described later.

Figure 13A:
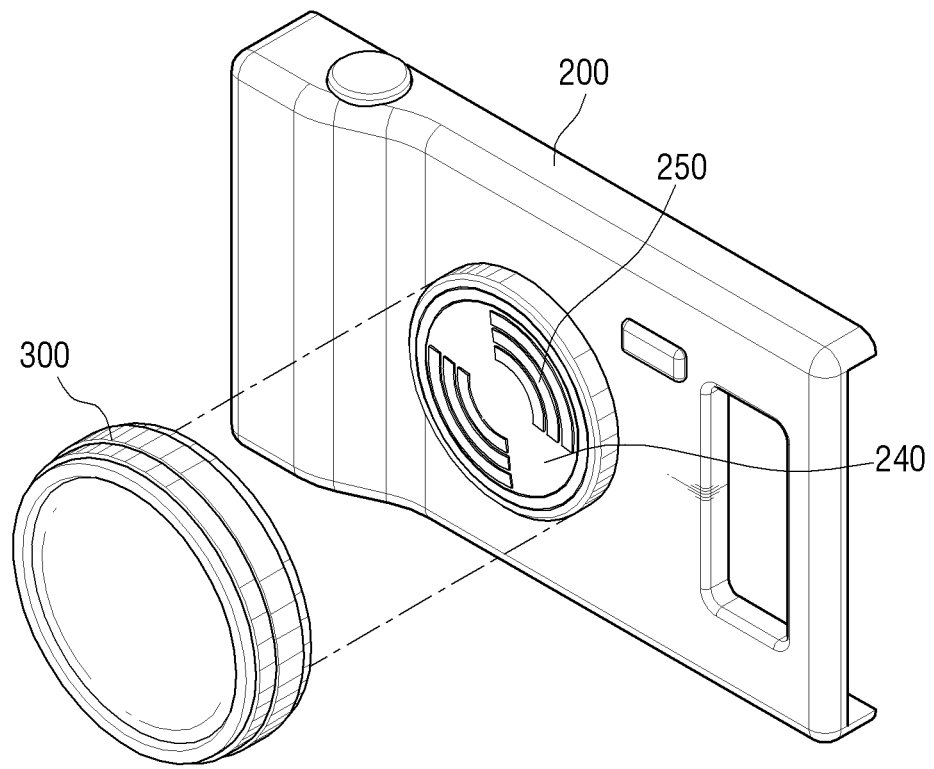
FIG. 13A is a view illustrating an image photographing apparatus and a lens that is detachable and rotatable.
Figure 13B:
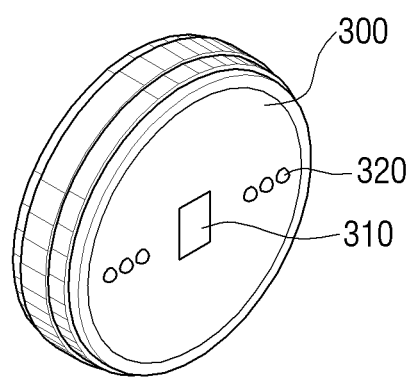
FIG. 13B is a view illustrating a lens that is detachable and rotatable, according to an exemplary embodiment.

In particular, the detachable lens may be realized as a shape which is attached into the image photographing apparatus 200 and then is independently rotatable. FIGS. 13A and 13B illustrate the another image photographing apparatus 200 according to an exemplary embodiment.

Referring to FIG. 13A, the contact pad 240 of the image photographing apparatus 200 may include a lens combiner 250 with which a plurality of pins are movably combined, so as to connect the image photographing apparatus 200 and a lens 300 to each other through the pins on a one-to-one correspondence basis. It should be noted that the pins do not electrically connect the image photographing apparatus 200 and the lens 300 to each other. Rather, the lens combiner 250 is a path through which the pins move when the lens 300 rotates. As shown in FIG. 13A, the lens combiner 250 may be formed so as to rotate the lens 300 within a range of 90°.

As shown in FIG. 13B, the lens 300 may include an image sensor 310 and a plurality of pins 320 for combining the lens 300 with the contact pad 240 of the another image photographing apparatus 200. Since the image sensor 310 is included in the lens 300, a capturing direction of a subject may be changed according to a rotation of the lens 300.

According to the structure described with reference to FIGS. 13A and 13B, if the lens 300 rotates, one of first and second images may rotate. For example, the first image may be captured in a fixed direction, and only the second image positioned inside the first image may be changed into a horizontal direction 1300 or a vertical direction 1310 as shown in FIG. 14A.

Figure 14A:
FIGS. 14A through 14C are views illustrating a method of combining a rotatable and detachable lens with a second photographing apparatus.
Figure 14B:
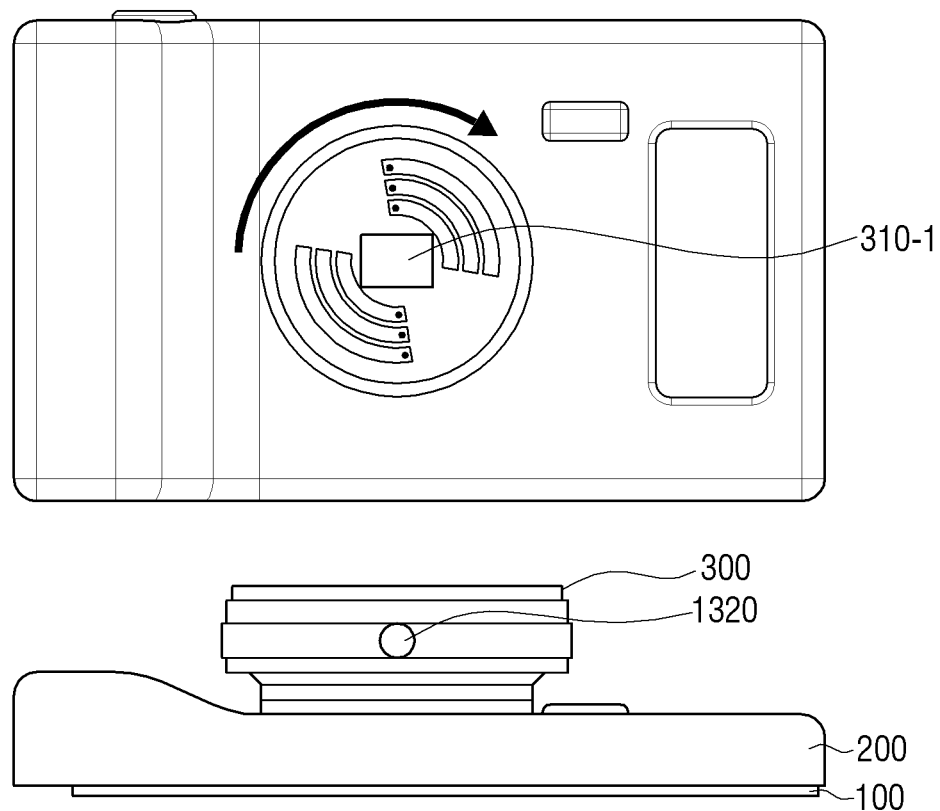

In detail, if a basic direction of an image sensor 310-1 included in the lens 300 is a horizontal direction, the lens 300 is attached into the image photographing apparatus 200 as shown in FIG. 14B, and an image is captured, an image, in which a second image having a long horizontal length is included in a first image having a long horizontal length as marked with reference numeral 1300 (see FIG. 14A), may be captured.

An indicator 1320 may be formed in a surface of the lens 300 to indicate a rotation direction of the lens 300. In particular, the indicator 1320 may be formed in a back surface of the lens 300 so as not to spoil an outer appearance and so as to enable the user, who grips an image photographing apparatus to perform photographing, to easily recognize the rotation direction of the lens 300, for example, by touch and/or by sight.

Figure 14C:
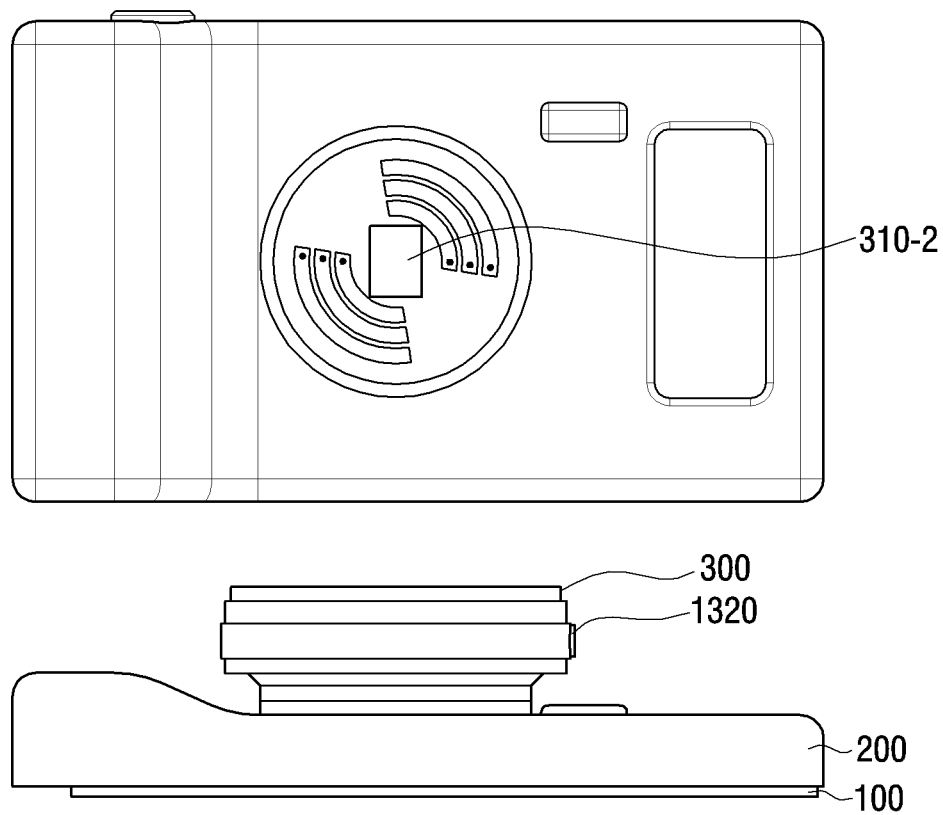

FIG. 14 C is a view illustrating the lens 300 that rotates at 90°. If the lens 300 rotates at 90°, pins of the lens 300 rotate at 90° to move along the lens combiner 250 of the another image photographing apparatus 200. Therefore, an image sensor 310-2 is in a vertical direction, and an image as marked with reference numeral 1310 of FIG. 14A may be captured. Also, the indicator 1320 that indicates the rotation direction of the lens 300 rotates at 90° in a reference direction. Therefore, before capturing an image or although a border line for distinguishing first and second images from each other is not displayed, the user may easily recognize whether the lens 300 rotates, by using the indicator 1320.

As described above, if the another image photographing apparatus 200 includes the lens 300 that is rotatable, the user may adjust a capturing direction of an image captured by the another image photographing apparatus 200 according to a simple manipulation of rotating the lens 300.

Figure 15A:
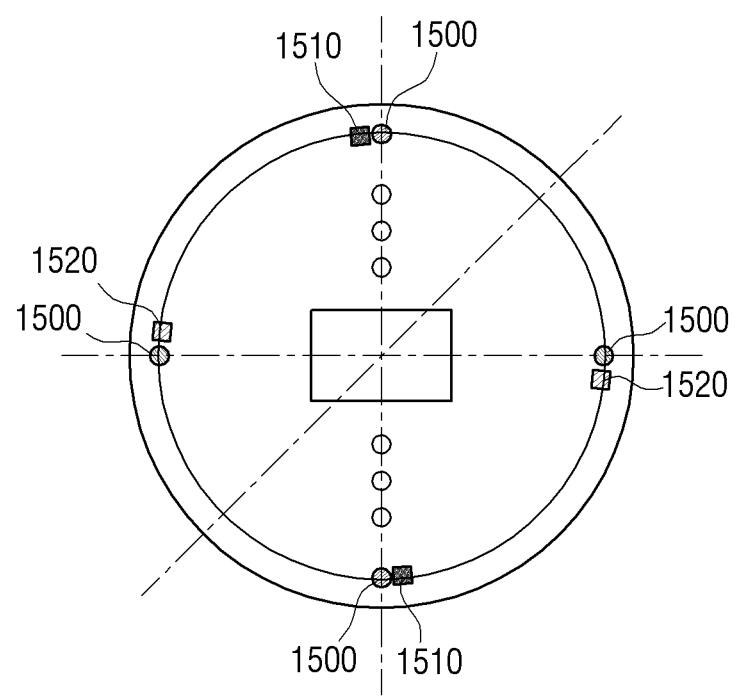

FIG. 15A is a view illustrating a rotatable and detachable lens that includes a plurality of magnets.

If the lens 300 is rotatable, and an image is captured when the lens 300 rotates at an arbitrary angle between 0° and 90°, a second image positioned in a first image may be captured in a slanting state. Alternatively, if the lens 300 is not fixed and thus moves when the image is captured, the second image may be captured with shaking. Therefore, the lens 300 may include magnets to be fixed into the image photographing apparatus 200. In particular, the lens 300 may further include a plurality of magnets to be fixed into the image photographing apparatus 200 at an angle of 0° or 90°.

In detail, the lens 300 may include a plurality of magnets 1500 to be combined into a corner of the image photographing apparatus 200 so as to increase a combination force with respect to the contact pad 240 of the image photographing apparatus 200. FIG. 15A is a view illustrating the magnets 1500 of the lens 300 that are included inside corners of the image photographing apparatus 200 in four directions. In this case, the same number of magnets corresponding to positions of the plurality of magnets 1500 are included inside corners of the contact pad 240. That is, the magnets 1500 are provided at 0, 90, 180, and 270 degrees around the lens 300.

Also, the lens 300 may further include magnets 1510 for fixing the image sensor 310 in a first direction and magnets 1520 for fixing the image sensor 310 in a second direction.

FIG. 15B is a cross-sectional view illustrating the lens 300 that is combined with the contact pad 240 of the image photographing apparatus 200. If a width of a reference direction of the image sensor 310 included in the lens 300 is longer than a height, a plurality of pins included in the lens 300 are combined with the contact pad 240 to correspond to an axis 1530 as shown in FIG. 15B. Here, the lens 300 may be attached into the image photographing apparatus 200 without moving when an image is captured, through magnetic forces of the magnets 1510.

If a command for rotating the lens 300 at 90° to enable the plurality of pins of the lens 300 to correspond to an axis 1550 is input by the user, the image sensor 310 is fixed to enable a height to be longer than the width. Therefore, even if the image photographing apparatus 100 captures an image in which a width is longer than a height, the image photographing apparatus 200 captures an image in which a height is longer than a width.

Rotational forces greater than magnetic forces of the magnets 1510 fixing the lens 300 are used to rotate the lens 300 so as to enable the plurality of pins of the lens 300 to correspond to the axis 1550. In other words, rotational forces are used to rotate the plurality of pins of the lens 300 beyond an axis 1540 according to a rotation command.

Therefore, if the magnetic forces of the magnets 1510 of the lens 300 for fixing the image sensor 310 in a first direction are greater than a force applied by the user to rotate the lens 300, and thus the plurality of pins of the lens 300 fail to rotate beyond an axis 1540, the plurality of pins of the lens 300 return into a direction corresponding to the axis 1530.

If the force applied by the user to rotate the lens 300 is greater than the magnetic forces of the magnets 1510 of the lens 300 for fixing the image sensor 310 in the first direction, and thus the plurality of pins of the lens 300 rotates beyond the axis 1540, the plurality of pins of the lens 300 move in a direction corresponding to the axis 1550.

In other words, if the plurality of pins of the lens 300 rotate beyond the axis 1540, the plurality of pins of the lens move in the direction corresponding to the axis 1550 through the magnetic forces of the lens 300 for fixing the image sensor 310 in a second direction.

As described above, the lens 300 that is rotatable may include a plurality of magnets so as to enable the user to easily rotate the lens 300 with a small force. Also, the lens 300 that is rotatable may be fixed into the image photographing apparatus 200 so as to enable the lens 300 not to move or shake when capturing an image.

FIGS. 16A through 16G are views illustrating a method of controlling an image covering phenomenon of the image photographing apparatus 100. The image covering phenomenon or a view angle interference (KERARE) refers to a phenomenon in which another lens is included in one image photographing range and thus interferes with image capturing due to a difference between view angles of a plurality of photographing units. In other words, a shape of a lens of another adjacent camera is included in an image where a view angle interference occurs.

Figure 16A:
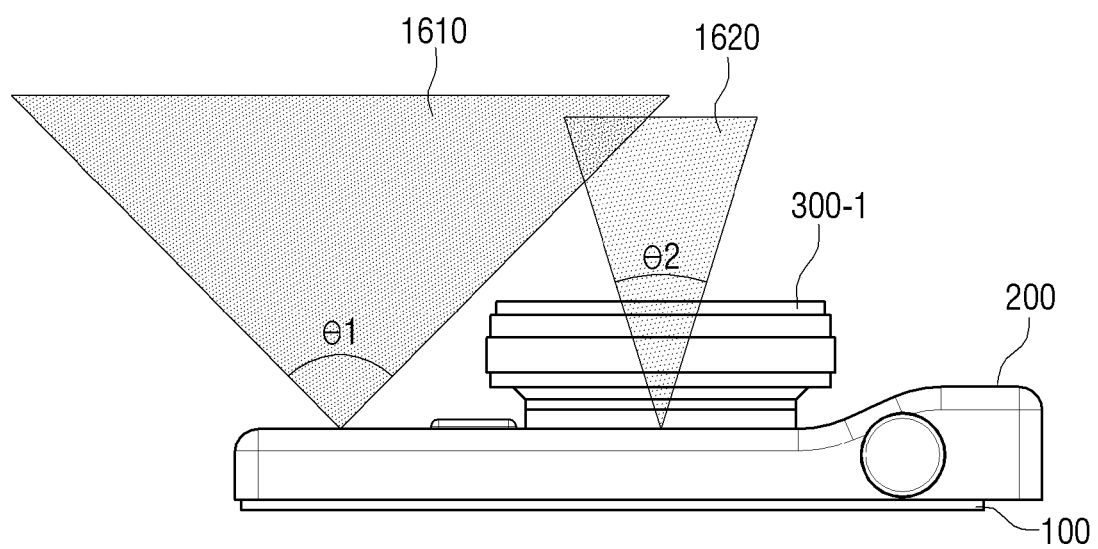
FIGS. 16A through 16G are views illustrating a method of controlling an image covering phenomenon of an image photographing apparatus.

In detail, FIG. 16A is a view illustrating ranges in which a lens of the camera 120 of the image photographing apparatus 100 and a lens 300-1 of the another image photographing apparatus 200 capture images at different view angles θ1 1610 and θ2 1620. In other words, if image covering does not occur, another lens is not included in ranges in which a plurality of lenses perform photographing as shown in FIG. 16A.

Figure 16B:
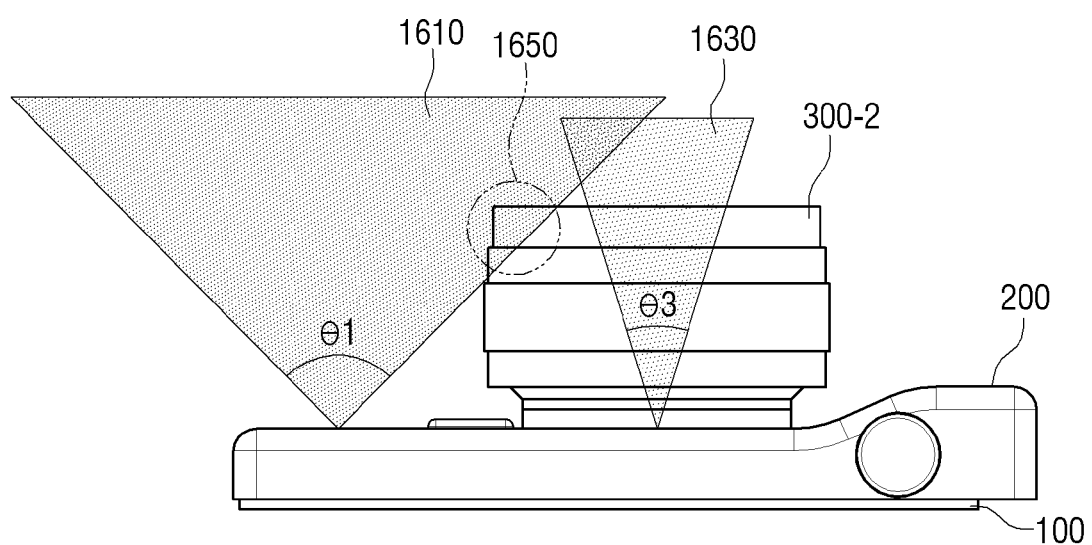

FIG. 16B is a view illustrating the image photographing apparatus 200 into which a different type of lens 300-2 is attached, according to an exemplary embodiment. In other words, if the lens 300-2 including a barrel having a relatively long length is attached into the image photographing apparatus 200, a part of the lens 300-2 may be included in a photographing range 1610 of a different lens as marked with reference numeral 1650. For example, this situation may occur when view angle θ1 of the camera 120 of the image photographing apparatus 100 is much wider than a viewing angle θ3 of the lens 300-2 of the camera of the image photographing apparatus 200.

Figure 16C:
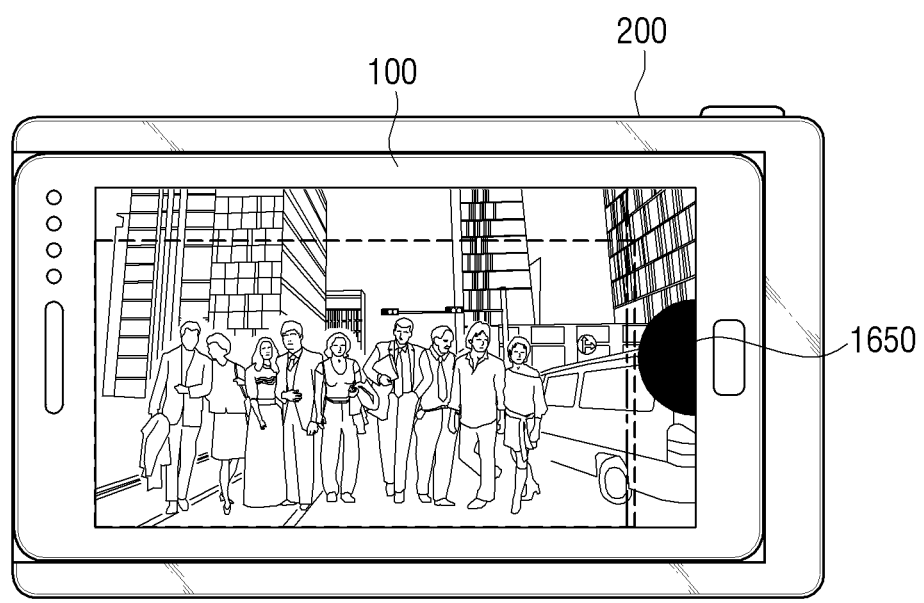

As a result, as shown in FIG. 16C, the part 1650 of the lens 300-2 may be included in a captured image to cover a subject.

Here, if the image photographing apparatus 100 determines whether the image covering phenomenon occurs, and it is determined that the image covering phenomenon occurs, a captured image may be generated by using the other part of a captured image except for a part of the captured image in which the shape part 1650 of the lens 300-2 is included.

Whether the image covering phenomenon occurs may be determined by an expression using parameters such as an view angle of a lens, a height of the lens, etc. Also, if an image having a preset pixel value is included in the captured image, the photographing apparatus 100 may determine that the image covering phenomenon occurs. Alternatively, the image photographing apparatus 100 may determine whether the image covering phenomenon occurs, by using a distance sensor that is realized as an ultrasonic sensor, an infrared sensor, or an electromagnetic wave sensor, etc.

If it is determined that the image covering phenomenon occurs, the image processor 130 may remove an area in which the image covering phenomenon occurs.

Figure 16D:
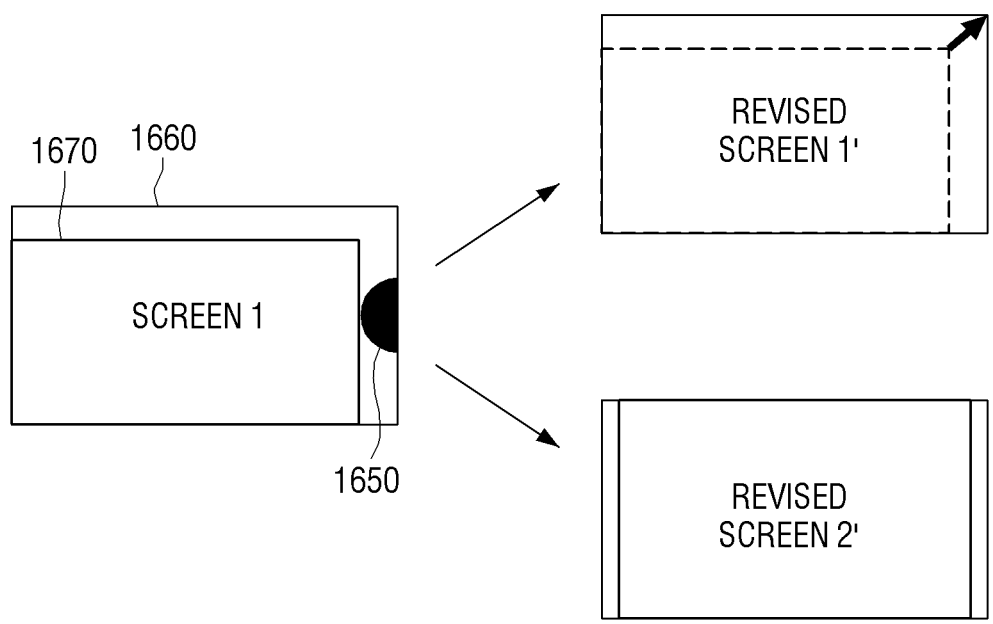

In detail, as shown in FIG. 16D, the image processor 130 of the image photographing apparatus 100 may crop an image part 1670, in which a shape part 1650 of the lens 300-2 is not included, i.e., the image part 1670 in which image covering does not occur, from a captured image 1660. Also, the controller 150 may enlarge the image part 1670, which is generated by the image processor 130 and in which the image covering does not occur, to a whole size of a display and display the enlarged image part 1670. Alternatively, the controller 150 may move the image part 1670, in which the image covering does not occur, into a center of the display and display the image part 1670 in the center of the display, without additionally adjusting a size of an image.

Figure 16E:
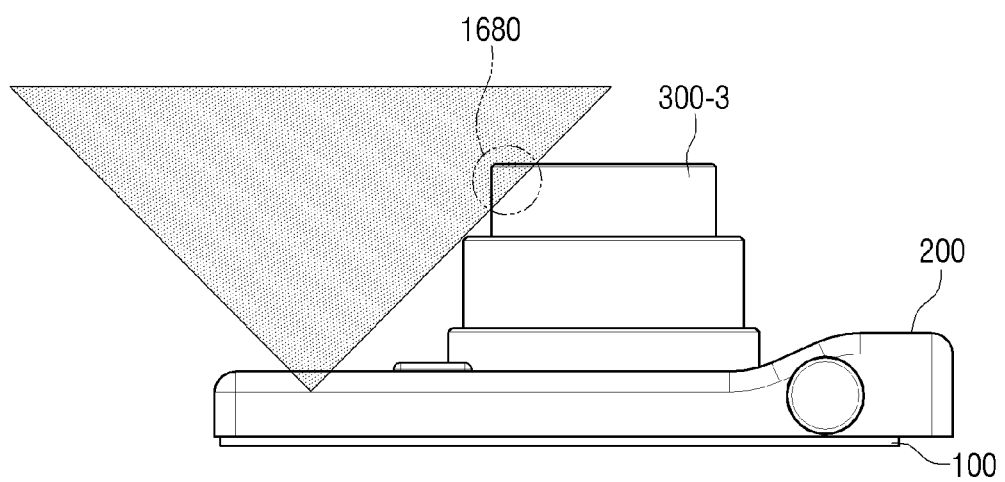

FIG. 16E is a view illustrating a lens 300-3 that includes a barrel whose length is adjusted and that is attached into the image photographing apparatus 200, according to an exemplary embodiment. In other words, if a length of a barrel of a lens of the image photographing apparatus 200 is adjusted by a magnification, the lens 300-3 may be included in a photographing range of the image photographing apparatus 100 according to the length of the barrel. In such a case, a part 1680 of the lens 300-3 may be included in a captured image to cover a subject.

Figure 16F:
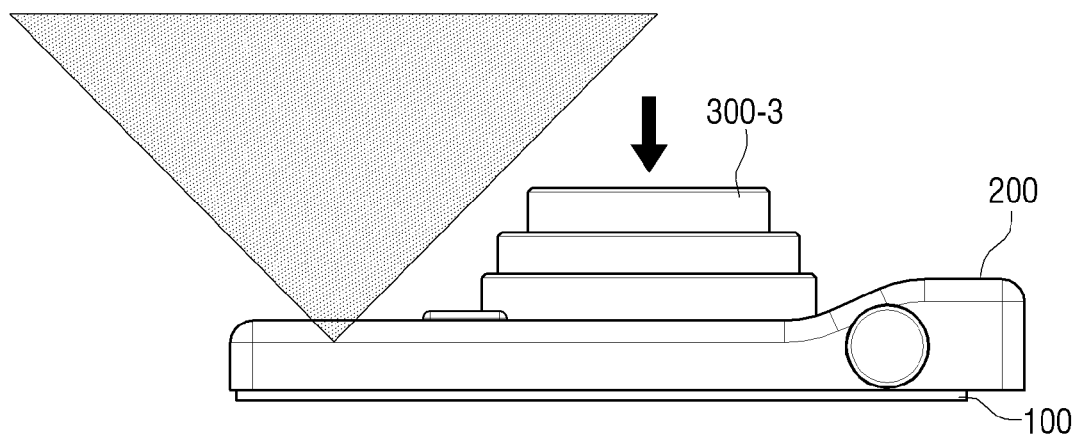

If the length of the barrel of the lens 300-3 lengthens, and the image photographing apparatus 100 determines that the image covering phenomenon occurs, the image photographing apparatus 100 may transmit a command for adjusting the length of the barrel of the lens 300-3 to the image photographing apparatus 200. In other words, if the image photographing apparatus 100 calculates a length of the barrel that enables the image covering phenomenon not to occur and transmits a command for adjusting the length of the barrel, the lens 300-3 may retract in such that the length of the barrier shortens, and the image covering phenomenon may disappear, as shown in FIG. 16F.

However, if the lens 300-3 zooms in due to the image covering phenomenon as described above, a photographing environment of the image photographing apparatus 200 changes. Therefore, the image photographing apparatus 100 may display information about the change in the photographing environment of the image photographing apparatus 200 to inform the user of the change.

Alternatively, since the length of the barrel of the lens 300-3 is adjustable by the user through the image photographing apparatus 100, the image photographing apparatus 100 may adjust the length of the barrel to display a UI for solving the image covering phenomenon on the display.

Figure 16G:
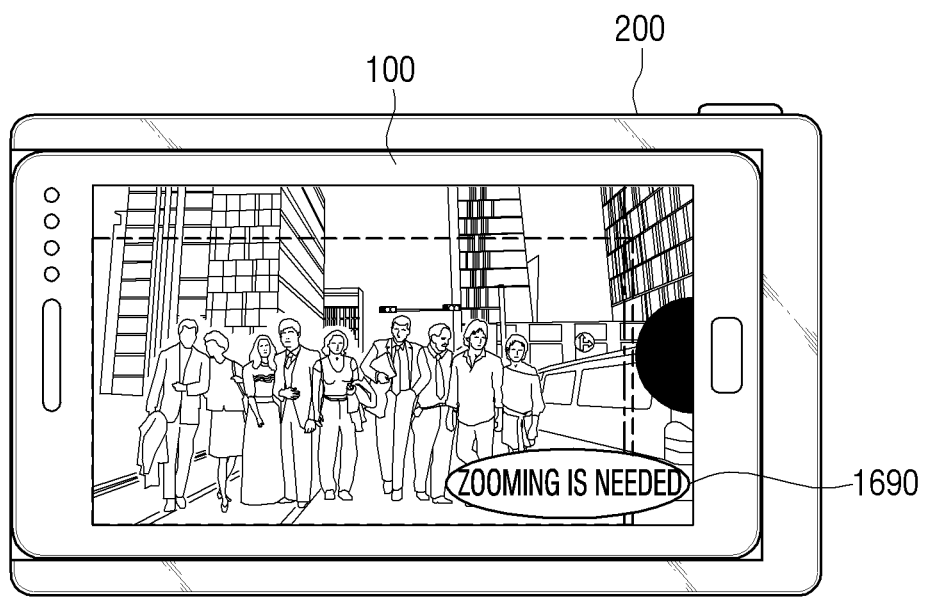

For example, as shown in FIG. 16G, the display 140 may display information 1690 to a user, such as for example the sentence "Zooming is needed."

According to the above-described method, the image covering phenomenon occurring when capturing an image by using a plurality of lenses may easily be solved.

Figure 17:
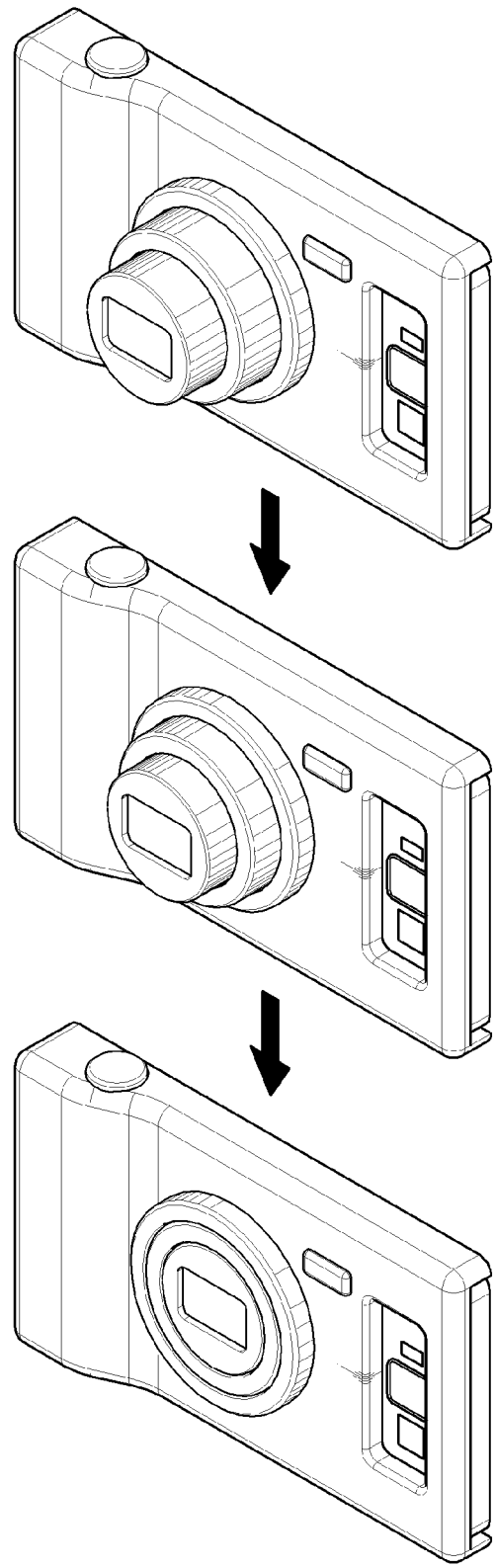
FIG. 17 is a view illustrating a method of adjusting a length of a barrel of a second image photographing apparatus, according to an exemplary embodiment.

FIG. 17 is a view illustrating a method of adjusting a length of a barrel of the image photographing apparatus 200, according to an exemplary embodiment.

In detail, the image photographing apparatus 100 or the image photographing apparatus 200 may include a sensing module (not shown). The sensing module is an element that includes various types of sensors, such as a gyro sensor, an acceleration sensor, etc., to sense motions of the image photographing apparatus 100 and the image photographing apparatus 200.

Therefore, as shown in FIG. 17, if it is sensed through the sensing module that the motion of the image photographing apparatus 100 meets a threshold condition when a barrel of a lens of the image photographing apparatus 200 combined with the image photographing apparatus 100 lengthens and an image is captured, the image photographing apparatus 100 may adjust a length of the barrel. The threshold condition may be preset.

For example, if it is sensed that the image photographing apparatus 100 moves at a threshold speed or more or it is sensed that the lens rotates at a threshold speed or more, the image photographing apparatus 100 may control to shorten the length of the barrel so as to enable the barrel to be housed in the another image photographing apparatus 200. The threshold speed may be preset.

In detail, if it is sensed through the sensing module that the image photographing apparatus 100 moves or rotates at the threshold speed or more, the image photographing apparatus 100 may transmit a command, which is to house the barrel in the image photographing apparatus 200, through the interface 115. The image photographing apparatus 200 may adjust the length of the barrel of the lens so as to enable the barrel to be housed in the image photographing apparatus 200 according to the received command.

The image photographing apparatus 100 may include a lens having a barrel whose length is adjusted. Here, the image photographing apparatus 100 may control to enable the length of the barrel to shorten immediately when it is sensed that the imaging photographing apparatus 100 moves or rotates at the threshold speed or more.

If it is not sensed that the motion of the image photographing apparatus 100 meets the threshold condition, the image photographing apparatus 100 is a portable phone, and a phone call is received when an image is captured, the image photographing apparatus 100 may adjust the length of the barrel. In other words, immediately when the phone call is received, the image photographing apparatus 100 may control to shorten the length of the barrel so as to enable the barrel to be housed in the image photographing 200. Alternatively, if the phone call is received, and a user command for receiving the phone call, such as pressing of a call button, is input, the image photographing apparatus 100 may control to shorten the length of the barrel.

If it is sensed that the motion of the image photographing apparatus 100 meets the threshold condition, if it is sensed that the phone call is received, and if it is sensed that the photographing apparatus 100 is inappropriate to capture an image or if a risk factor of damaging the image photographing apparatus 100 is sensed, the image photographing apparatus 100 may control the length of the barrel of the image photographing 100 or the image photographing apparatus 200.

An image photographing system in which the image photographing apparatus 100 and the image photographing apparatus 200 are combined with each other and which further includes an additional detachable part will now be described with reference to FIGS. 18A through 18D.

Figure 18A:
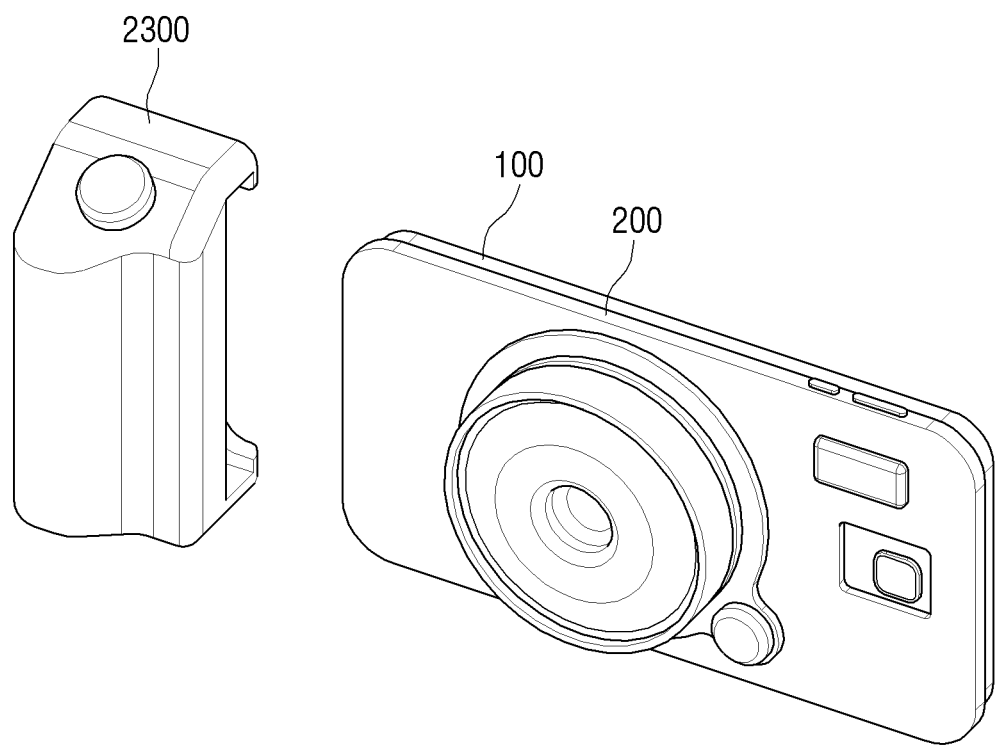
FIGS. 18A through 18D are views illustrating an additional inputter that is detachable from an image photographing system into which a plurality of image photographing apparatuses are combined.

FIG. 18A is a view illustrating a gripper 2300 that is an additional detachable part and includes a shutter button, according to an exemplary embodiment. In other words, for convenience and aesthetic of portability, the image photographing apparatus 100 and the image photographing apparatus 200 may be formed of thin and light materials. Here, when capturing an image, the user may feel uncomfortable about fixing the image photographing system to capture an image. Therefore, the user may stably capture an image by using the gripper 2300 including the additional shutter button.

Figure 18B:
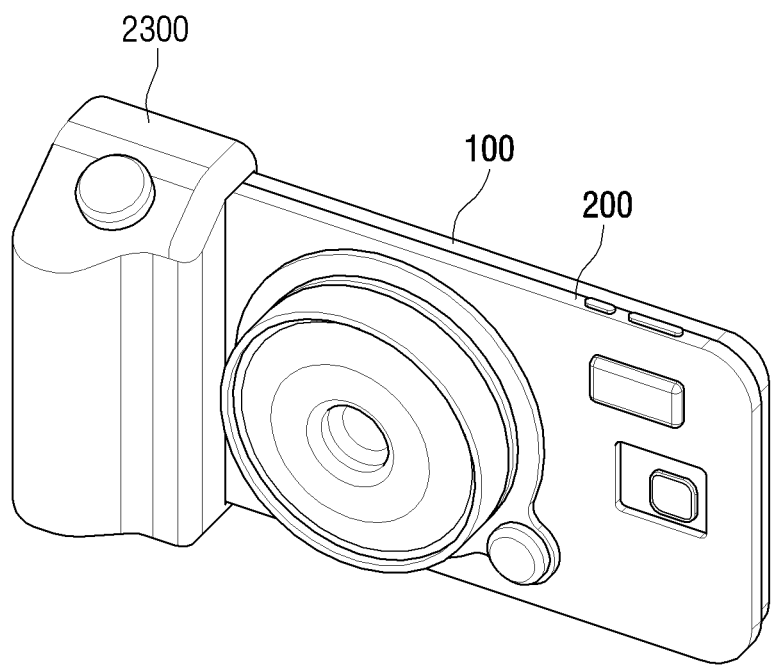

In other words, as shown in FIG. 18B, if the gripper 2300 including the shutter button is attached onto the image photographing system, the image photographing apparatus 100 may sense the attachment of the gripper 2300. For example, the image photographing apparatus 100 may include a sensor in a position in which the gripper 2300 is installable, to sense the attachment of the gripper 2300.

If it is determined that the gripper 2300 is attached onto the image photographing system, the image photographing apparatus 100 may capture an image according to a user manipulation of pressing the shutter button of the gripper 2300. In other words, as described above, the image photographing apparatus 100 may receive a command for capturing an image through a touch screen of the image photographing apparatus 100 or a shutter button of the image photographing apparatus 200 and capture an image according to a user manipulation of pressing the shutter button of the gripper 2300.

Therefore, the user may capture an image by selectively using an inputter, such as the shutter button of the gripper 2300, the shutter button of the image photographing apparatus 200, or the touch screen of the image photographing apparatus 100, according to a photographing environment, a photographing position, a photographing posture, a photographer, etc.

Figure 18C:
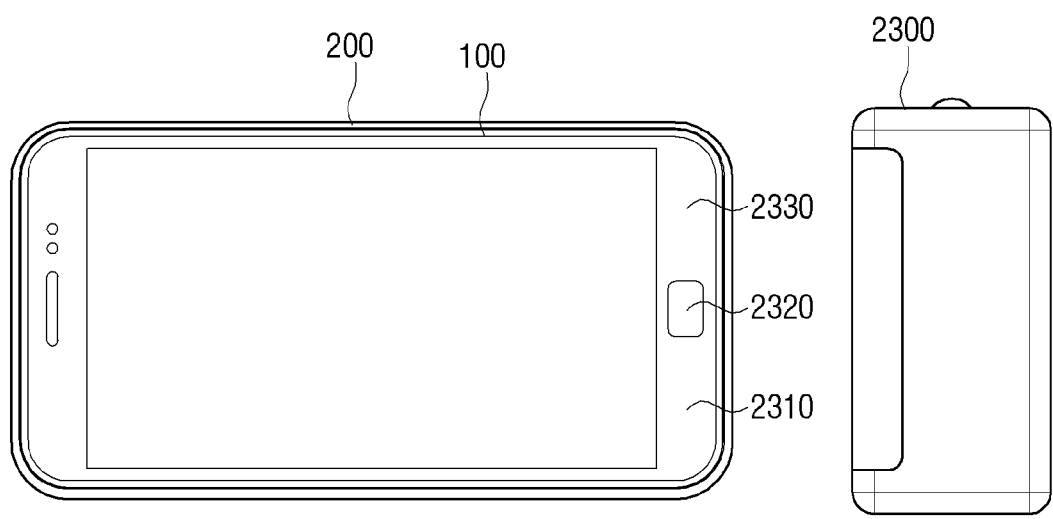

If the photographing apparatus 100 is a smartphone, the image photographing apparatus 100 may include a home button 2320 and touch inputters 2310 and 2330 in a position in which the gripper 2300 will be combined with the image photographing apparatus 100, as shown in FIG. 18C. In other words, the image photographing apparatus 100 may receive various types of user commands for controlling the image photographing apparatus 100 through the home button 2320 and the touch inputters 2310 and 2330. If the gripper 2300 is combined with the image photographing apparatus 100, the home button 2320 and the touch inputters 2310 and 2330 of the image photographing apparatus 100 may be covered with the gripper 2300.

Figure 18D:
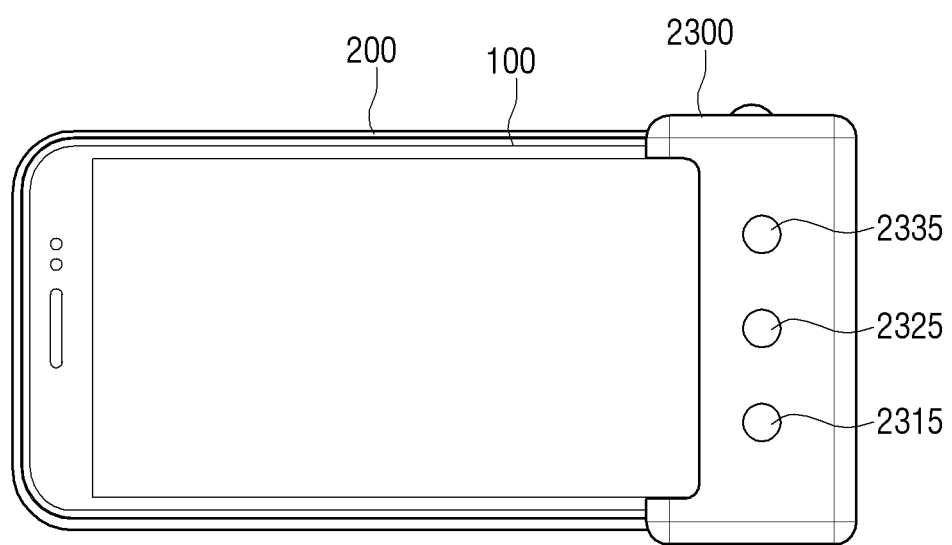

Therefore, as shown in FIG. 18D, if the gripper 2300 is combined with the image photographing apparatus 100, the home button 2320 and the touch inputters 2310 and 2330 of the image photographing apparatus 100 may be matched into the same position on the gripper 2300. In other words, a touch sensor may be installed on a surface of the gripper 2300 so as to enable the image photographing apparatus 100 to receive a touch input through the combined gripper 2300. Therefore, the home button 2320 and the touch inputters 2310 and 2330 of the image photographing apparatus 100 respectively match with touch inputs 2325, 2315, and 2335 of the gripper 2300. Also, the user may use a user command that is input into the image photographing apparatus 100 through the matched touch inputs 2315, 2325, and 2335.

There has been described a method of displaying a captured image, in which a first image captured by the camera 120 of the image photographing apparatus 100 and a second image captured by the camera 220 of the image photographing apparatus 200 overlap each other, as a live view if the image photographing apparatus 200 is combined with the image photographing apparatus 100, and an image is captured. However, this is only an exemplary embodiment, and thus if a user command for selecting an area with which the second image will overlap is input when displaying the first image as a live view, the second image may overlap with the selected area to be displayed as a live view according to the user command.

Figure 19A:
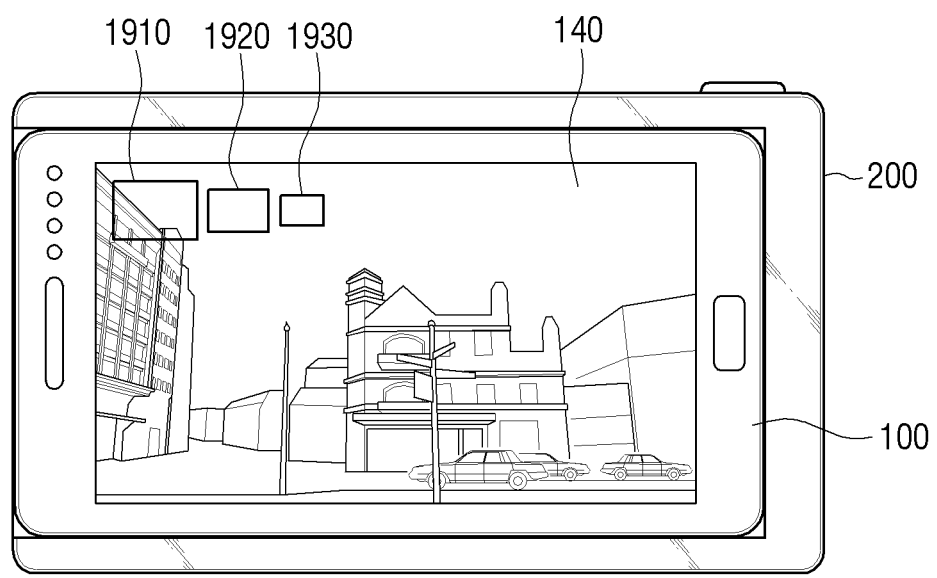
FIGS. 19A through 19C are views illustrating a method of selecting an area in which images captured by a second image photographing apparatus will overlap with one another to be displayed.

In detail, as shown in FIG. 19A, the image photographing apparatus 100 may display a first image captured by the camera 120 as a live view on the display 140. Also, the display 140 may display UIs 1910 through 1930 for selecting an area with which a second image will overlap to be displayed.

For example, as shown in FIG. 19A, the image photographing apparatus 100 may display box type icons indicating 2× zoom 1910, 3× zoom 1920, and 5× zoom 1930 on a part of the display 140.

Therefore, if a command, which is to select one of the box type icons indicating the 2× zoom 1910, the 3× zoom 1920, and 5× zoom 1930 and a command, which is to move the selected box type icon into an area of the display 140, are input, the second image captured by the camera 220 of the image photographing apparatus 200 may overlap with the area, into which the selected box type icon is moved, to be displayed in the area according to a selected magnification.

Figure 19B:
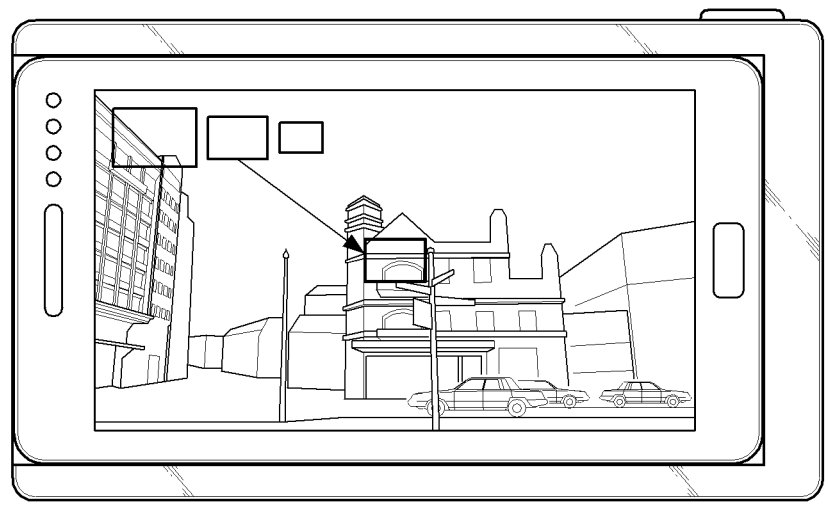

For example, as shown in FIG. 19B, if a command for long touching the box type icon indicating the 3× zoom 1920 is input, the camera 220 of the image photographing apparatus 200 may adjust a magnification so as to capture an image corresponding to 3× zoom of the first image displayed on the display 140.

If a command for touching the box type icon indicating the 3× zoom 1920 to drag the box type icon into an arbitrary area is input, the image photographing apparatus 100 may overlap a 3× zoom image captured by the image photographing apparatus 200 with an area, into which the box type icon is moved, to display the overlapped 3× zoom image.

Figure 19C:
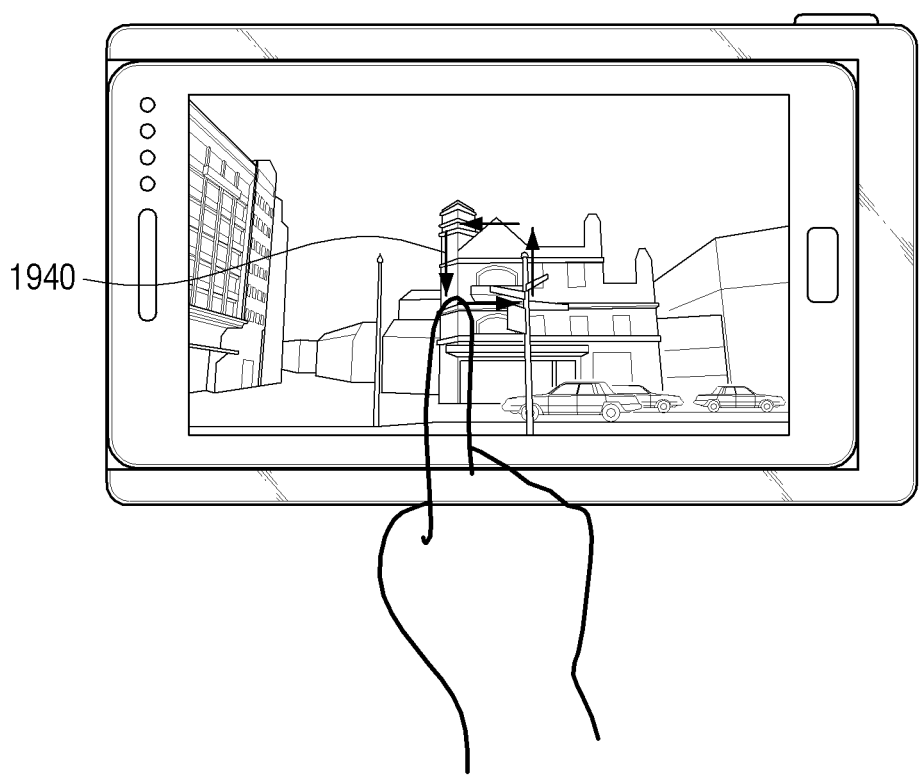

Also, FIG. 19C is a view illustrating an area with which a second image will overlap to be displayed and which is selected according to a drawing command, according to an exemplary embodiment.

In detail, even if the display 140 does not display a UI for selecting the area with which the second image will overlap to be displayed, a user command for overlapping and displaying the second image may be input. For example, the user command may be drawing an area 1940 with a finger or stylus, etc. Then, the image photographing apparatus 100 calculates a magnification corresponding to a size of the input second image. In other words, as a size of the area, with which the drawn second image will overlap, is small, the image photographing apparatus 100 may calculate a high magnification at which the image photographing apparatus 200 are to perform photographing.

Also, the image photographing apparatus 100 transmits a photographing magnification, which is calculated through the interface 115, to the image photographing apparatus 200. The image photographing apparatus 200 adjusts a magnification of a lens thereof according to the received photographing magnification. In particular, if the lens of the image photographing apparatus 200 is a telephoto lens, the image photographing apparatus 200 may capture a high magnification image.

A method of displaying a captured image according to a user command for selecting an area with which a second image will overlap to be displayed will now be described in detail with reference to FIGS. 20A through 20D.

Figure 20A:
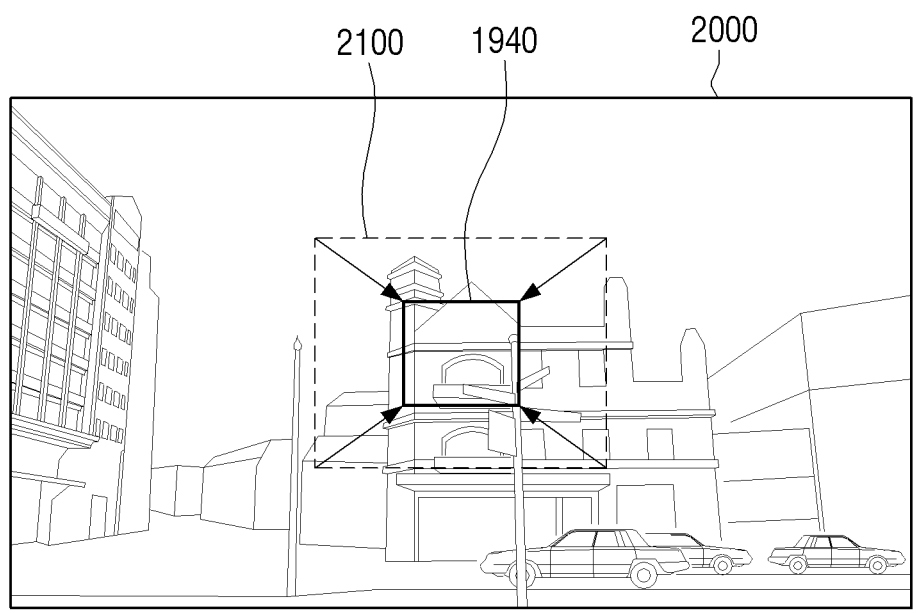
FIGS. 20A through 20D are views illustrating a method of generating an image through a selection of an area in which images captured by a second image photographing apparatus will overlap with one another to be displayed.

FIG. 20A is a view illustrating an area 1940 which is selected according to a user command and is included in a center of a second image 2100 captured by the image photographing apparatus 200 to match with the center of the second image 2100. Here, the image processor 130 of the image photographing apparatus 100 receives an image captured by the image photographing apparatus 200 to crop a part corresponding to the area 1940 selected from the second image 2100. Also, the image photographing apparatus 100 may overlap the selected area 1940 with a first image 2000 to generate a captured image and display the generated captured image. The captured image may be displayed as a live view.

The image photographing apparatus 100 may transmit a command for increasing a photographing magnification of an image, which is to be captured by the image photographing apparatus 200, to the image photographing apparatus 200. In other words, since a small size of the selected area 1940 indicates that photographing is performed at a high magnification, the image photographing apparatus 100 may transmit a command for increasing a photographing magnification of the image photographing apparatus 200 to the another image photographing apparatus 200.

If the image photographing apparatus 200 increases the photographing magnification to enable the photographing magnification to correspond to the size of the selected area 1940 and captures a second image according to a user command, the image photographing apparatus 100 may receive the second image to generate a captured image in which the second image overlaps with the first image 2000. The image photographing apparatus 100 may also display the generated captured image as a live view.

Figure 20B:
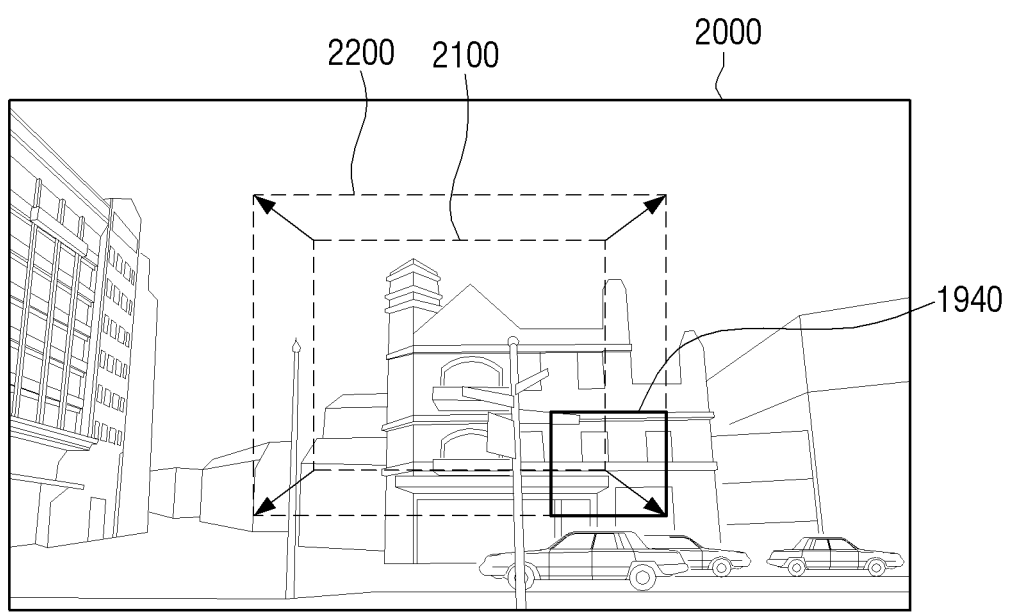

FIG. 20B is a view illustrating the area 1940 which is selected according to a user command and is included only in a part of a second area 2100 captured by the image photographing apparatus 200. Here, the image photographing apparatus 100 may transmit a command for lowering a photographing magnification of an image captured by the image photographing apparatus 200 to the another image photographing apparatus 200. In other words, the image photographing apparatus 100 may calculate a size of the second area 2100 that may include the selected area 1940 and calculate a photographing magnification at which the image photographing apparatus 200 will perform photographing, according to the calculated size of the second area 2100. The image photographing apparatus 100 may transmit the calculated photographing magnification to the image photographing apparatus 200 through the interface 115.

If the another image photographing apparatus 200 lowers the photographing magnification to include the area 1940 selected according to the user command and captures a second image 2200, the image photographing apparatus 100 receives the second image 2200 to crop a part corresponding to the selected area 1940 from the second image 2200. The image photographing apparatus 100 may overlap the selected area 1940 with the first image 2000 to generate a captured image and display the generated captured image as a live view.

Figure 20C:
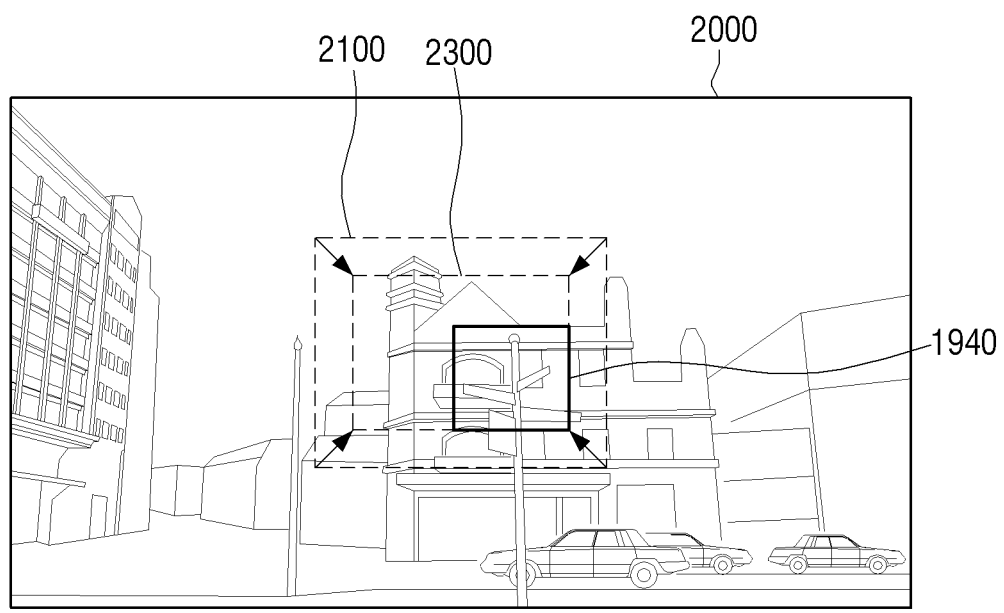

FIG. 20C is a view illustrating the area 1940 which is selected according to the user command and is included in a second image 2100 captured by the image photographing apparatus 200 but does not match with a center of the second image 2100. The image photographing apparatus 100 may transmit a command for increasing a photographing magnification of an image captured by the image photographing apparatus 200, to the another image photographing apparatus 200. In other words, the image photographing apparatus 100 may calculate a photographing magnification of the image photographing apparatus 200 for enabling an arbitrary corner of the second image 2100 to match with a corner of the selected area 1940 and transmit the calculated photographing magnification to the image photographing apparatus 200.

If the image photographing apparatus 200 increases a photographing magnification to include the area 1940 selected according to the user command and captures a second image 2300, the image photographing apparatus 100 receives the second image 2300 to crop a part corresponding to the selected area 1940 from the second image 2300. The image photographing apparatus 100 may overlap the selected area 1940 with the first image 2000 to generate a captured image and display the generated captured image as a live view.

Figure 20D:
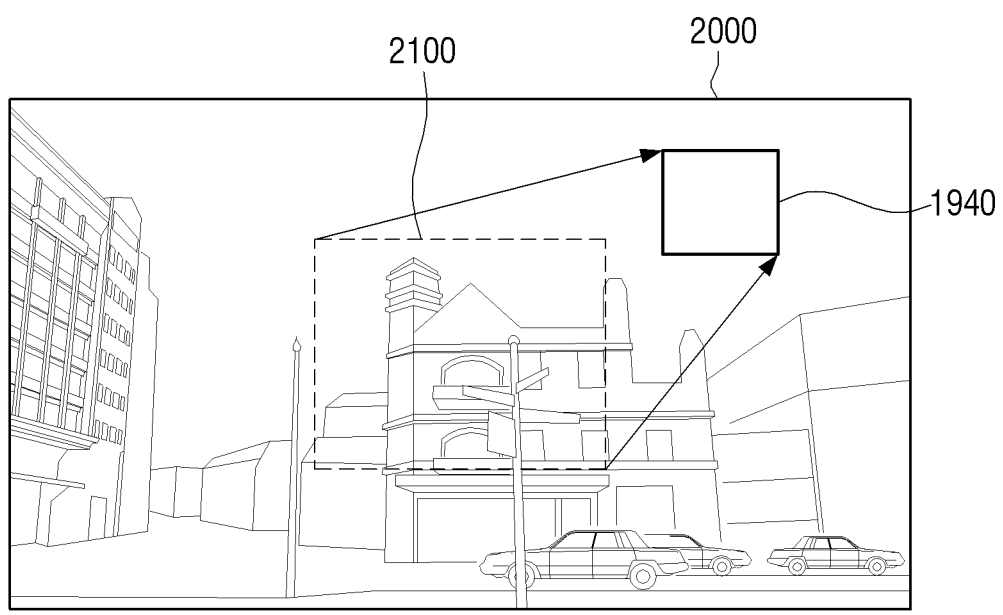

As shown in FIG. 20D, the area 1940 selected according to the user command may not match with a center of a second image 2100 captured by the image photographing apparatus 200 and may not overlap with the center of the second image 2100. Here, an additional user manipulation of rotating a lens of the image photographing apparatus 200 may be used. The image photographing apparatus 100 may calculate movement information of the lens of the image photographing apparatus 200 for enabling the second image 2100 captured by the image photographing apparatus 200 to be included in the area 1940 selected according to the user command.

In other words, if the image photographing apparatus 100 includes a rotatable lens, the image photographing apparatus 100 may calculate a direction and a rotation angle of the rotatable lens for enabling the second image 2100 including the selected area 1940 to be captured. Alternatively, if a lens is included in a movable shape in the image photographing apparatus 200, the image photographing apparatus 100 may calculate a movement direction and a movement distance of the lens.

The image photographing apparatus 100 may also display a guide UI, which is to adjust a lens of the image photographing apparatus 200 according to the calculated movement information, on the display 140. In particular, the guide UI for adjusting the lens may be displayed as an arrow, an indicator line, or the like so as to enable the user to easily check the movement information.

Alternatively, if the image photographing apparatus 100 calculates a rotation angle, etc. of the lens of the image photographing apparatus 200, the image photographing apparatus 100 may transmit information about the rotation angle of the lens through the interface 1150 so as to control the another image photographing apparatus 200 to rotate the lens. Therefore, although the user does not input an additional manipulation of adjusting a rotation or a position of the lens, the lens of the image photographing apparatus 200 may be controlled.

According to the above-described method of selecting an area with which a second image captured by the image photographing apparatus 200 will overlap to be displayed, if a lens of the image photographing apparatus 200 is a telephoto lens, the user may use an image, which is captured through the telephoto lens, for a part in which the image will be enlarged and captured, to acquire a clear enlarged image.

In other words, if the image photographing apparatus 100 is a wide-angle lens, it may be difficult to clearly capture a subject that is positioned at a long distance. Therefore, the image photographing apparatus 100 may enlarge and capture one of a plurality of subjects that is positioned at a long distance and that the user wants to particularly highlight, by using a telephoto lens of the another image photographing apparatus 200 that is combined with the image photographing apparatus 100.

Figure 21:
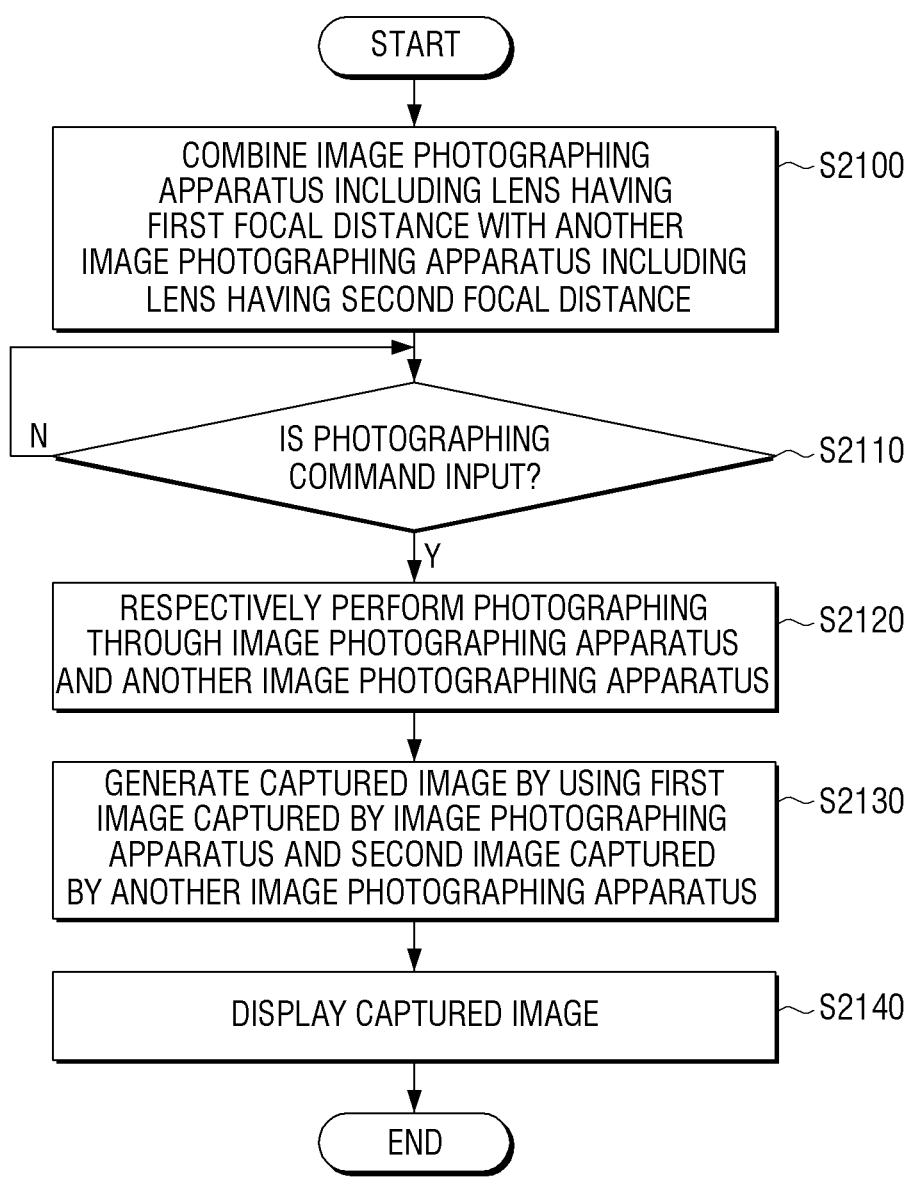
FIG. 21 is a flowchart illustrating an image photographing method using an image photographing apparatus, according to an exemplary embodiment.

FIG. 21 is a flowchart illustrating an image photographing method using image photographing apparatuses according to an exemplary embodiment. In operation S2100, the image photographing apparatus 100 including a lens having a first focal distance and the image photographing apparatus 200 including a lens having a second focal distance are disposed to perform photographing in the same direction. In operation S2110, the image photographing apparatus 100 determines whether a photographing command is input.

The photographing command may be a touch command that is input through a touch screen of the image photographing apparatus 100. Alternatively, if the image photographing apparatus 200 includes an additional inputter such as a shutter button, the photographing command may be input through a user manipulation of pressing the shutter button. The image photographing apparatus 100 may receive the photographing command through a communicator or an interface that is to electrically connect the image photographing apparatus 100 to the image photographing apparatus 200.

If it is determined in operation S2110 that the photographing command is input, the image photographing apparatus 100 and the image photographing apparatus 200 respectively capture images in operation S2120. In other words, the image photographing apparatus 100 and the image photographing apparatus 200 may respectively capture the images according to the photographing command that is once input through the image photographing apparatus 100 or the image photographing apparatus 200.

In operation S2130, the image photographing apparatus 100 generates a captured image by using a first image captured by the image photographing apparatus 100 and a second image captured by the image photographing apparatus 200. In particular, if the image photographing apparatus 100 includes a wide-angle lens having a relatively short focal distance, and the image photographing apparatus 200 includes a telephoto lens having a relatively long focal distance, the mage photographing apparatus 100 may overlap an image captured through the telephoto lens with an image captured by the wide-angle lens to generate a captured image. However, this is only an exemplary embodiment, and thus the image photographing apparatus 100 may include a telephoto lens, the image photographing apparatus 200 may include a wide-angle lens, and the image photographing apparatus 100 and the image photographing apparatus 200 may include the same type of lenses.

In operation S2140, the photographing apparatus 100 displays the generated captured image. In particular, the image photographing apparatus 100 may display the generated captured image as a live view image. Here, if an image capturing command is input through an inputter of the image photographing apparatus 100 or the image photographing apparatus 200, the image photographing apparatus 100 may capture a live view image to display or store the live view image.

FIG. 22 is a sequence diagram illustrating an image photographing method using a portable phone 100 and a cover type camera 400, according to an exemplary embodiment. The cover type camera 400 is an image photographing apparatus that is realized as a case type covering a surface of the image photographing apparatus 100. In particular, the cover type camera 400 may include a shutter button that is formed on an outer surface thereof. The cover type camera 400 may include a telephoto lens.

The portable phone 100 and the cover type camera 400 may be connected to each other through a short range communication such as Bluetooth, NFC, WiFi, or the like or may exchange data or a user command through interfaces that contact each other.

According to one of the above-described various methods, the cover type camera 400 transmits a connection signal to the portable phone 100 that is positioned around the cover type camera 400, in operation S2200.

In operation S2210, the portable phone 100 approves a connection through a user approval. In operations S2220 and S2230, the portable phone 100 and the cover type camera 400 respectively capture images.

For example, the portable phone 100 may capture the image by using a wide-angle lens thereof, and the cover type camera 400 may capture the image by using a telephoto lens thereof. In other words, the portable phone 100 and the cover type camera 400 may capture the images at different view angles.

In operation S2240, the cover type camera 400 transmits the captured image to the portable phone 100. In operation S2250, the portable phone 100 generates a captured image by using the images captured by the portable phone 100 and the cover type camera 400. In other words, if the portable phone 100 includes a wide-angle lens, and the cover type camera 400 includes a telephoto lens, the portable phone 100 may overlap an image captured through the telephoto lens with an image captured through the wide-angle lens to generate a captured image.

In operation S2260, the portable phone 100 displays the generated captured image as a live view. In operation S2270, the cover type camera 400 inputs an image capturing command. In operation S2280, the cover type camera 400 transmits the image capturing command to the portable phone 100. In other words, the image capturing command may be a user manipulation of pressing a shutter button of the cover type camera 400.

In operation S2290, the portable phone 100 captures an image according to the received image capturing command. In operation S2300, the portable phone 100 displays the captured image. The portable phone 100 may capture the image and simultaneously store the captured image. Alternatively, if the portable phone 100 displays the captured image, and a user command for storing an image is input, the portable phone 100 may store the captured image.

As described above, the cover type camera 400 performs an operation of capturing an image and transmitting the captured image to the portable phone 100. However, this is only an exemplary embodiment, and thus if an image captured by the portable phone 100 is transmitted to the cover type camera 400, the cover type camera 400 may generate a captured image.

Also, a user command, such as an image photographing command or an image capturing command, may be input through one of a plurality of image photographing apparatuses or photographing units of the plurality of image photographing apparatuses.

A live view that is generated by using images captured by a plurality of image photographing apparatuses may be displayed through one of the plurality of image photographing apparatuses or a display of an arbitrary one of the plurality of image photographing apparatuses.

According to various exemplary embodiments as described above, a user may conveniently and effectively perform photographing by using a plurality of image photographing apparatuses including lenses having different focal distances.

An image photographing method of an image photographing apparatus according to the above-described various exemplary embodiments may be coded as software and then stored on a non-transitory readable medium. The non-transitory readable medium may be installed on various types of devices to be used.

The non-transitory computer-readable medium refers to a medium which does not store data for a short time such as a register, a cache memory, a memory, or the like but semi-permanently stores data and is readable by a device. In detail, the above-described applications or programs may be stored and provided on a non-transitory computer readable medium such as a CD, a DVD, a hard disk, a blue-ray disk, a universal serial bus (USB), a memory card, a ROM, or the like.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An image photographing apparatus comprising:
    a camera comprising a first lens having a first focal distance, the camera being configured to capture a first image by using the first lens having the first focal distance;
    a combiner configured to combine the image photographing apparatus with another image photographing apparatus comprising a second lens having a second focal distance longer than the first focal distance;
    a controller configured to, in response to a photographing command, control the camera and the another image photographing apparatus to respectively perform photographing;
    an image processor configured to generate a captured image by using the first image captured by the camera and a second image captured by the another image photographing apparatus; and
    a display configured to display the captured image,
    wherein the controller is further configured to control the image processor to overlap the second image with a local area of the first image and generate the captured image comprising a border line for distinguishing the second and first images from each other, and
    wherein the controller is further configured to, in response to a user command being input to adjust a magnification of the captured image, adjust a photographing magnification of at least one selected from the camera and the another image photographing apparatus.

2. The image photographing apparatus of claim 1, wherein the controller is configured to, in response to the photographing command being transmitted from the another image photographing apparatus, control the camera to capture thea subject according to the photographing command.

3. The image photographing apparatus of claim 1, further comprising:
    an inputter configured to receive the photographing command,
    wherein the controller is configured to, in response to the photographing command being input, control the camera to capture a subject and transmit the photographing command to the another image photographing apparatus.

4. The image photographing apparatus of claim 1, further comprising:
    an interface configured to be electrically connected to an interface of the another image photographing apparatus in response to the another image photographing apparatus being combined with the image photographing apparatus through the combiner.

5. The image photographing apparatus of claim 1, wherein the controller is configured to control the display to display the first image on a whole area of the display in response to a first image part being touched on the captured image displayed on the display, and control the display to display the second image on the whole area of the display in response to a second image part being touched on the captured image.

6. The image photographing apparatus of claim 1, wherein the first image is a first live view image, and the second image is a second live view image,
    wherein the controller is configured to control the image processor to display, on the display, an integrated live view, in which a second live view captured by the another image photographing apparatus overlaps with a local area of a first live view captured by the camera and, in response to a photographing command being input, control the image processor to generate a captured image corresponding to the integrated live view.

7. The image photographing apparatus of claim 6, wherein the controller is configured to control the image processor to, in response to the first live view being displayed and a user-selected local area being selected from the first live view according to a user manipulation, overlap the second live view captured by the another image photographing apparatus in an arbitrary local area.

8. The image photographing apparatus of claim 7, wherein the controller is configured to determine a photographing magnification according to a size of the user-selected local area to control the camera so as to capture a subject at the photographing magnification and transmit a control command for controlling the photographing magnification of the another image photographing apparatus.

9. The image photographing apparatus of claim 6, further comprising:
a storage configured to store the captured image,
wherein the controller is configured to, in response to a continuous photographing command, control the display to display the first live view on the display, control the another image photographing apparatus to perform continuous photographing, and store a generated continuous captured image in the storage.

10. The image photographing apparatus of claim 1, further comprising:
a sensor configured to sense a motion of the image photographing apparatus,
wherein the controller is configured to, in response to a barrel of the another image photographing apparatus being lengthened, a subject being captured, and the motion of the image photographing apparatus meeting a threshold condition, control a length of the barrel of the another image photographing apparatus.

11. The image photographing apparatus of claim 1, wherein the combiner comprises a structure with which one of the another image photographing apparatus and a battery cover is selectively detachably combined.

12. An image photographing method of an image photographing apparatus, the image photographing method comprising:
in response to the image photographing apparatus and another image photographing apparatus being combined with each other and a photographing command being received, capturing a first image of a subject through the image photographing apparatus and a second image of the subject through the another image photographing apparatus, wherein the image photographing apparatus comprises a first lens having a first focal distance and the another image photographing apparatus comprises a second lens having a second focal longer than the first focal distance;
generating a captured image by using the first image captured by the image photographing apparatus and the second image captured by the another image photographing apparatus;
displaying the captured image; and
in response to a user command being input to adjust a magnification of the captured image, adjusting a photographing magnification of at least one selected from the image photographing apparatus and the another image photographing apparatus,
wherein the second image overlaps with a local area of the first image, and the captured image comprises a border line for distinguishing the second and first images from each other is generated.

13. The image photographing method of claim 12, wherein in response to the photographing command being transmitted from the another image photographing apparatus, the subject is captured according to the photographing command.

14. The image photographing method of claim 12, further comprising:
receiving the photographing command through an inputter of the image photographing apparatus; and
capturing the subject according to the photographing command and transmitting the photographing command to the another image photographing apparatus.

15. The image photographing method of claim 12, further comprising:
in response to the image photographing apparatus being physically combined with the another image photographing apparatus, electrically connecting the image photographing apparatus to an interface of the another image photographing apparatus.

16. The image photographing method of claim 12, wherein the first image is displayed on a whole area of a display in response to a first image part being touched on the displayed captured image, and the second image is displayed on the whole area of the display in response to a second image part being touched on the captured image.

17. The image photographing method of claim 12, wherein the first image is a first live view image, and the second image is a second live view image,
wherein an integrated live view, in which the second live view image overlaps with a local area of the first live view image, is displayed, and in response to the photographing command being input, a captured image corresponding to the integrated live view is generated.

18. The image photographing method of claim 17, wherein in response to the first live view image being displayed and a user-selected local area being selected from the first live view image according to a user manipulation, the captured image is generated so as to enable a second live view captured by the another image photographing apparatus to overlap in the local area.

19. The image photographing method of claim 18, further comprising:
determining a photographing magnification according to a size of the user-selected local area to capture the subject according to the photographing magnification and transmit the photographing magnification to the another image photographing apparatus.

20. The image photographing method of claim 17, further comprising:
in response to a continuous photographing command being input, displaying the first live view image, controlling the another image photographing apparatus to perform continuous photographing, and storing a generated continuous captured image.

21. The image photographing method of claim 12, further comprising:
sensing a motion of the image photographing apparatus; and
in response to a barrel of the another image photographing apparatus being lengthened, the subject being captured, and the motion of the image photographing apparatus meeting a threshold condition, adjusting a length of the barrel of the another image photographing apparatus.

22. An image photographing system comprising:
a first image photographing apparatus comprising a first lens having a first focal distance, the first image photographing apparatus being configured to capture a first image according to a photographing command; and
a second image photographing apparatus comprising a second lens having a second focal distance longer than the first focal distance, the second image photographing apparatus being configured to capture a second image according to the photographing command,
wherein the first image photographing apparatus is further configured to:
receive the second image captured by the second image photographing apparatus,
generate a captured image by using the first and second images,
display the generated captured image, and
in response to a user command being input to adjust a magnification of the captured image, adjust a photographing magnification of at least one selected from the first image photographing apparatus and the second image photographing apparatus, and
wherein the first image photographing apparatus is further configured to overlap the second image with a local area of the first image to generate the captured image, and generate the captured image comprising a border line for distinguishing the second and first images from each other.

23. The image photographing system of claim 22, wherein the second image photographing apparatus further comprises a lens that is rotatable and detachable according to a direction of photographing, the lens comprising an image sensor.

24. The image photographing system of claim 23, wherein the lens comprises magnets at intervals along a radial direction thereof and is configured to rotate in the radial direction, in response to a rotation command being input that exerts a force greater than magnetic forces of the magnets.

25. An image photographing method comprising:
in response to a first image photographing apparatus and a second image photographing apparatus being combined with each other and a photographing command being received, capturing a plurality of images through the first image photographing apparatus and the second image photographing apparatus, wherein the first image photographing apparatus comprises a first lens having a first focal distance and the second image photographing apparatus comprises a second lens having a second focal distance longer than the first focal distance;
generating a captured image through the first image photographing apparatus by using a first image captured by the first image photographing apparatus and a second image captured by the second image photographing apparatus and displaying the generated captured image; and
in response to a user command being input to adjust a magnification of the captured image, adjust a photographing magnification of at least one selected from the first image photographing apparatus and the second image photographing apparatus,
wherein the second image overlaps with a local area of the first image, and the captured image comprises a border line for distinguishing the second and first images from each other is generated.

26. An image photographing apparatus comprising:
an image sensor;
an interface; and
a controller configured to control the interface to electrically connect the interface of the image photographing apparatus to an interface of another image photographing apparatus,
wherein the controller is further configured to:
in response to a photographing command, control the image sensor to capture a first image of a subject at a first focal distance and control the another image photographing apparatus to capture a second image of the subject at a second focal distance that is longer than the first focal distance,
receive the second image from the another image photographing apparatus through the interface,
generate a captured image using the first image and the second image, and
in response to a user command being input to adjust a magnification of the captured image, adjust a photographing magnification of at least one selected from the image photographing apparatus and the another image photographing apparatus, and
wherein the controller is further configured to overlap the second image with a local area of the first image and generate the captured image comprising a border line for distinguishing the second and first images from each other.

27. The image photographing apparatus of claim 26, wherein the controller is configured to control the interface to electrically connect to the interface of the another image photographing apparatus using radio frequency communication.

28. The image photographing apparatus of claim 27, wherein the interface of the image photographing apparatus is a Bluetooth (BT) interface or a near field communication (NFC) interface.

29. The image photographing apparatus of claim 28, wherein the photographing command is input to the image photographing apparatus, and at a time when the photographing command is input, the image photographing apparatus is physically connected to the another image photographing apparatus.

30. The image photographing apparatus of claim 26, further comprising an attachable and detachable lens that is in optical communication with the image sensor.

31. The image photographing apparatus of claim 26, further comprising a display, wherein the controller is configured to control the display to display the captured image on the display.

32. The image photographing apparatus of claim 26, further comprising a combiner that is configured to physically connect the image photographing apparatus to the another image photographing apparatus.

33. The image photographing apparatus of claim 32, wherein the combiner comprises a plurality of grooves or a plurality of protrusions.

34. The image photographing apparatus of claim 32, wherein the combiner comprises a gripper that is configured to receive a portion of both the image photographing apparatus and the another image photographing apparatus.

35. A photographing apparatus comprising a plurality of cameras, comprising:
a display;
a first camera unit configured to perform photographing through a first focus distance;
a second camera unit configured to perform photographing through a second focus distance different from the first focus distance; and a controller configured to display, on the display, a live view image photographed through at least one of the first camera unit and the second camera unit, and obtain a still image corresponding to the live view image in response to a photographing command being input through an add-on device attached to the photographing apparatus, wherein the add-on device is detachable from the photographing apparatus and is configured to receive input of a user command to control an operation of the photographing apparatus, wherein the controller is further configured to combine live view images photographed through the first camera unit and the second camera unit, display the combined live view images on the display, and in response to the photographing command being input, obtain a still image corresponding to the combined live view images.

36. The photographing apparatus as claimed in claim 35, wherein the controller is further configured to, while a first live view image photographed through the first camera unit is being displayed and in response to the photographing command being input, obtain a first still image corresponding to the first live view image, and, while a second live view image photographed through the second camera unit is being displayed and in response to the photographing command being input, obtain a second still image corresponding to the second live view image.

37. The photographing apparatus as claimed in claim 35, wherein the add-on device is a gripper.

38. The photographing apparatus as claimed in claim 35, wherein the add-on device is attached to one of a left side and a right side of the photographing apparatus in a landscape orientation.

39. The photographing apparatus as claimed in claim 37, wherein the add-on device comprises a shutter button to receive the photographing command, and the shutter button is, while the add-on device is attached to the photographing apparatus, disposed on a side of the add-on device adjacent to an upper surface of the photographing apparatus in a landscape orientation.

40. The photographing apparatus as claimed in claim 38, wherein the add-on device further comprises a plurality of buttons to control different operations of the photographing apparatus.

* * * * *